US008106742B2

(12) United States Patent
Marshall et al.

(10) Patent No.: US 8,106,742 B2
(45) Date of Patent: Jan. 31, 2012

(54) REMOTELY CONTROLLING ONE OR MORE CLIENT DEVICES DETECTED OVER A WIRELESS NETWORK USING A MOBILE DEVICE

(75) Inventors: Kevin Marshall, Kirkland, WA (US); Michael R. Longe, Seattle, WA (US); John Lefevre, Seattle, WA (US)

(73) Assignee: Tegic Communications, Inc., Burlington, MA (US)

( * ) Notice: Subject to any disclaimer, the term of this patent is extended or adjusted under 35 U.S.C. 154(b) by 1210 days.

(21) Appl. No.: 11/834,131

(22) Filed: Aug. 6, 2007

(65) Prior Publication Data

US 2008/0034081 A1    Feb. 7, 2008

Related U.S. Application Data

(63) Continuation-in-part of application No. 11/770,511, filed on Jun. 28, 2007.

(60) Provisional application No. 60/821,480, filed on Aug. 4, 2006, provisional application No. 60/942,922, filed on Jun. 8, 2007.

(51) Int. Cl.
*G05B 19/02* (2006.01)
*G08C 19/12* (2006.01)
*H04N 5/44* (2006.01)
*H04B 10/00* (2006.01)

(52) U.S. Cl. ...... 340/4.3; 340/13.24; 398/106; 398/107; 348/734

(58) Field of Classification Search ............ 340/825.22, 340/825.72, 4.3, 13.24; 398/106–107; 348/734
See application file for complete search history.

(56) References Cited

U.S. PATENT DOCUMENTS

| 6,243,707 B1 * | 6/2001 | Humpleman et al. ............... 1/1 |
| 6,256,019 B1 * | 7/2001 | Allport ........................ 345/169 |
| 6,759,967 B1 * | 7/2004 | Staller ....................... 340/12.28 |

(Continued)

FOREIGN PATENT DOCUMENTS

WO    WO 2005/104441    11/2005

OTHER PUBLICATIONS

Abowd, G.D. and Mynatt, E., "Charting Past, Present, And Future Research In Ubiquitous Computing", *ACM Transactions on Computer-Human Interaction*, vol. 7, No. 1, Mar. 2000, pp. 29-58.

(Continued)

*Primary Examiner* — Jennifer Mehmood
*Assistant Examiner* — Andrew Bee
(74) *Attorney, Agent, or Firm* — Chapin IP Law, LLC; Barry W. Chapin, Esq.

(57) ABSTRACT

According to one general aspect, a method according to the present application includes remotely controlling wirelessly networked devices via a mobile unit. The method includes receiving, at a mobile unit and from a user, an input, analyzing the input to identify a networked device associated with the input, determining whether the networked device is presently accessible via a wireless network; determining whether to establish a connection with the networked device based on whether the networked device is determined to be presently accessible via the wireless network. The method also includes establishing a connection with the networked device if it is determined that the networked device is accessible via the wireless network and enabling the user to interact with the networked device through the mobile unit to remotely control the networked device.

68 Claims, 13 Drawing Sheets

U.S. PATENT DOCUMENTS

| | | | | |
|---|---|---|---|---|
| 2002/0151327 | A1* | 10/2002 | Levitt | 455/556 |
| 2003/0038849 | A1* | 2/2003 | Craven et al. | 345/864 |
| 2003/0080874 | A1 | 5/2003 | Yumoto et al. | |
| 2003/0103088 | A1* | 6/2003 | Dresti et al. | 345/835 |
| 2003/0234737 | A1* | 12/2003 | Nelson et al. | 341/176 |
| 2004/0148632 | A1* | 7/2004 | Park et al. | 725/81 |
| 2004/0189508 | A1* | 9/2004 | Nguyen | 341/176 |
| 2005/0159823 | A1* | 7/2005 | Hayes et al. | 700/19 |
| 2006/0140170 | A1 | 6/2006 | Dorner | |
| 2006/0158368 | A1 | 7/2006 | Walter et al. | |
| 2007/0130607 | A1* | 6/2007 | Thissen et al. | 725/132 |
| 2007/0240179 | A1* | 10/2007 | Lavigne | 725/14 |
| 2007/0243851 | A1* | 10/2007 | Shoarinejad et al. | 455/343.2 |

OTHER PUBLICATIONS

Beyer H, Holtzblatt K (1998) Contextual design: defining customer-centered systems. Academic Press, San Francisco, California, 9 pages.

Brumitt B., and Cadiz, JJ, "'Let There Be Light' Examining Interfaces For Homes of The Future", *Proceedings Of The Conference On Human-Computer Interaction (Interact 2001)*, Tokyo, Japan, Jul. 2001, IOS Press, Amsterdam, 8 pages.

Crabtree, A., et al., "Pattern-Based Support For Interactive Design In Domestic Settings", *Proceedings Of The Conference On Designing Interactive Systems: Processes, Practices, And Techniques*, London, UK, Jun. 2002,pp. 265-275.

Crowley, J.L., et al., "Things That See", *Communications of the ACM*, 43(3), Mar. 2000, pp. 54-64.

Hindus, D., et al., "Casablanca: Designing Social Communication Devices for the Home", *Proceedings Of The SIGCHI 2001 Conference On Human Factors In Computing Systems*, Seattle, Washington, Mar./Apr. 2001, pp. 325-332.

Maxwell, K., "The Maturation of HCI: Moving Beyond Usability Towards Holistic Interaction", *Human-Computer Interaction In The New Millennium*. ACM Press, Carroll, J. (ed), Boston, Massachusetts, pp. 191-209, (2001).

Mozer, M., "An Intelligent Environment Must Be Adaptive", *IEEE Intelligent Systems*, vol. 14(2), pp. 11-13, (1999).

Mynatt, E.D., et al., "Digital Family Portraits: Supporting Peace Of Mind For Extended Family Members", *Proceedings Of The SIGCHI 2001 Conference On Human Factors In Computing Systems*, Seattle, Washington, Mar./Apr. 2001, pp. 333-340.

Preece J, Rogers Y, Sharp H (2002) Interaction design: beyond human-computer interaction. Wiley, New York, 9 pages.

Rodden T., Benford S., "The evolution of buildings and implications for the design of ubiquitous domestic environments", *Proceedings Of The SIGCHI 2003 Conference On Human Factors In Computing Systems*, Fort Lauderdale, Florida, pp. 9-16, 2003.

Van de Sluis, R., et al., "User Interface For An In-Home Environment", *Proceedings Of The Conference On Human-Computer Interaction (Interact 2001)*, Tokyo, Japan, Jul. 2001. IOS Press, Amsterdam, 9 pages.

Venkatesh, A., Nicosia, F., "New Technologies for the Home-Development of a Theoretical Model for Household Adoption and Use", *Advances in Consumer Research*, vol. XIV, Association for Consumer Research, Provo, Utah, pp. 552-558, Brucks M, MacInnis D (eds), 1997.

Weiser, M. "The World is not a Desktop", *Interactions*, vol. 1, ACM Press, New York, 1994, pp. 7-8.

Yates A, Etzioni O., Weld, D., "A Reliable Natural Language Interface to Household Appliances", *Proceedings Of The International Conference On Intelligent User Interfaces (IUI 2003)*, Miami, Florida, Jan. 2003, 8 pages.

"Universal Plug and Play," *Wikipedia, the free encyclopedia*, reprinted from http://en.wikipedia.org/wiki/UPNP, reprinted on Jul. 21, 2006, 4 pages.

"Personal Area Network," *Wikipedia, the free encyclopedia*, reprinted from http://en.wikipedia.org/wiki/Personal_area_network, reprinted on Feb. 19, 2007, 2 pages.

International Search Report and Written Opinion for corresponding application No. PCT/US2007/075263, dated Feb. 7, 2008, 14 pages.

\* cited by examiner

REMOTELY CONTROLLING ONE OR MORE CLIENT DEVICES DETECTED OVER A WIRELESS NETWORK USING A MOBILE DEVICE

CROSS REFERENCE TO RELATED APPLICATIONS

This application is a continuation-in-part of U.S. patent application Ser. No. 11/770,511, filed Jun. 28, 2007, and titled "Remotely Controlling One Or More Client Devices Detected Over A Wireless Network Using A Mobile Device," which claims the benefit of U.S. Provisional Application Ser. No. 60/821,480, filed Aug. 4, 2006 and titled "External Device Data and Service Control Through Ambiguous Search Interface" and the U.S. Provisional Application Ser. No. 60/942,922, filed Jun. 8, 2007 and titled "Remotely Controlling One Or More Client Devices Detected Over A Wireless Network Using A Mobile Device." The entire contents of the prior applications are incorporated herein by reference. This application also incorporates by reference in its entirety U.S. patent application Ser. No. 11/609,697, filed Dec. 12, 2006, and titled "Mobile Device Retrieval and Navigation."

TECHNICAL FIELD

This disclosure relates a mobile device acting as a remote control for one or more client devices detected over a wireless network.

BACKGROUND

Some remote controls provide the ability to address only a small subset of electronic devices, from a small subset of manufacturers. The interfaces for so-called "universal remote controls" are cluttered with a large number of user controls (e.g., physical buttons or screens within a liquid crystal display ("LCD")), in attempting to provide functionality associated with the union of supported devices. The large number of user controls may reduce the quality of the user experience, because it may require that the quantity of the options either be reduced to fit on the screen and/or that the options be hidden within menu hierarchy.

SUMMARY

According to one general aspect, a method according to the present application includes remotely controlling wirelessly networked devices via a mobile unit. The method includes receiving, at a mobile unit and from a user, an input, analyzing the input to identify a networked device associated with the input, determining whether the networked device is presently accessible via a wireless network; determining whether to establish a connection with the networked device based on whether the networked device is determined to be presently accessible via the wireless network. The method also includes establishing a connection with the networked device if it is determined that the networked device is accessible via the wireless network, identifying the capabilities associated with the networked device, and enabling the user to interact with the networked device through the mobile unit by selecting from among at least two of the capabilities associated with the networked device.

Implementations of the above general aspect may include one or more of the following features. For example, receiving the input may include receiving, at a wireless phone, the input. Alternatively or additionally, receiving the input may include receiving, at a personal digital assistant, the input. Alternatively or additionally, receiving the input may include receiving, at a portable e-mail device, the input. The portable e-mail device may include a Blackberry or a Sidekick. Receiving the input may also include receiving, at a portable music player, the input. Alternatively or additionally, receiving the input may include receiving an input that identifies the networked device with which the user wishes to interact.

Implementations of the above general aspect may also include determining whether the networked device is presently accessible on the wireless network and if it is determined that the networked device is presently accessible on the wireless network, presenting to the user one or more capabilities associated with the networked device. Presenting to the user one or more capabilities associated with the networked device may include: (1) requesting, from the networked device, the one or more capabilities; (2) receiving, from the networked device, the one or more capabilities; and (3) presenting to the user the received one or more capabilities. Requesting the one or more capabilities may include requesting, from the networked device, a subset of all available capabilities; receiving the one or more capabilities may include receiving, from the networked device, the subset of all available capabilities; and presenting to the user the received one or more capabilities may include presenting to the user the received subset of all available capabilities. Requesting the subset of all available capabilities may include requesting the top five most popular, recently used, or favorite capabilities.

Implementations of the above general aspect may also include referencing a personal profile of the user to determine the top five most popular, recently used, or favorite capabilities. Alternatively or additionally, implementations of the above general aspect may include referencing a demographic location of the user to determine the top five most popular, recently used, or favorite capabilities. Alternatively or additionally, implementations of the above general aspect may also include referencing attributes associated with a user group of the user to determine the top five most popular, recently used, or favorite capabilities.

Enabling the user to interact with the networked device may include enabling the user to interact with the one or more presented capabilities and based on the user's interaction with the one or more presented capabilities, sending a command to the networked device instructing the networked device to control the one or more presented capabilities.

Implementations of the above general aspect also may include informing the user that the networked device does not appear on the wireless network upon determination of the same. Presenting to the user one or more capabilities associated with the networked device may include: (1) requesting, from an external server, the one or more capabilities, (2) receiving, from the external server, the one or more capabilities, and (3) presenting to the user the received one or more capabilities. Requesting the one or more capabilities may include requesting, from the external server, the one or more capabilities either before or after determining the accessibility of the networked device. Requesting the one or more capabilities may include requesting, from the external server, a subset of all available capabilities, receiving the one or more capabilities may include receiving, from the external server, the subset of all available capabilities, and presenting to the user the received one or more capabilities may include presenting to the user the received subset of all available capabilities. Requesting the subset of all available capabilities may include requesting the top five most popular, recently used, or favorite capabilities.

Implementations of the above general aspect also may include referencing a personal profile of the user to determine the top five most popular, recently used, or favorite capabilities. Referencing the personal profile of the user to determine the top five most popular, recently used, or favorite capabilities may include referencing the personal profile of the user to identify capabilities that have been used more than a threshold amount and rendering the capabilities that have been used more than the threshold amount as the top five most popular, recently user, or favorite capabilities.

Implementations of the above general aspect also may include referencing a geographic location of the user to determine the top five most popular, recently used, or favorite capabilities. Referencing the geographic location of the user to determine the top five most popular, recently used, or favorite capabilities may include referencing the geographic location of the user to identify capabilities that have been used, by at least one other user within the geographic location, more than a threshold amount and rendering the capabilities that have been used more than the threshold amount as the top five most popular, recently user, or favorite capabilities.

Implementations of the above general aspect also may include referencing attributes associated with a user group of the user to determine the top five most popular, recently used, or favorite capabilities. Referencing the attributes associated with the user group to determine the top five most popular, recently used, or favorite capabilities may include referencing the attributes associated with the user group to identify capabilities that have been used, by members of the user group, more than a threshold amount and rendering the capabilities that have been used more than the threshold amount as the top five most popular, recently user, or favorite capabilities.

Receiving the input may include receiving an input that relates to a capability of a networked device that the user wishes to control. Analyzing the input may include analyzing the input to identify the capability associated with the input and based on the identified capability, identifying a networked device associated with the capability. Alternatively or additionally, analyzing the input to identify the capability associated with the input further may include referencing a database that includes a list of available capabilities associated with one or more networked devices, comparing the input with the available capabilities to identify a responsive capability associated with the input, and based on the result of comparison, identifying at least one responsive capability. Referencing the database may include referencing a database stored at the mobile unit. Alternatively or additionally, referencing the database may include referencing a database stored at a remote server accessible over the network. Identifying the at least one responsive capability may include identifying multiple responsive capabilities.

Implementations of the above general aspect also may include displaying to the user of the mobile unit the identified multiple responsive capabilities and soliciting the user to select from among the identified multiple responsive capabilities. Alternatively or additionally, implementations of the above general aspect also may include determining whether the identified at least one responsive capability requires an additional input from the user for controlling the at least one responsive capability, if it is determined that no additional input is required, sending a command signal to the networked device associated with the at least one responsive capability and thereby remotely controlling the networked device, and if it is determined that an additional input is required, requesting the additional input from the user. Alternatively or additionally, implementations of the above general aspect also may include receiving the additional input from the user in response to the request for the same.

Analyzing the input further may include sending the input to a server; and receiving, from the server, information that identifies the networked device associated with the input. Sending the input to the server may include sending the input to an external server that is remotely accessible by the mobile unit. The server may be remotely accessible via a wireless network.

Determining whether the networked device is presently accessible via a wireless network further may include sending, to the server, the information that identifies the networked device and receiving, from the server, information identifying present accessibility of the networked device. The information identifying present accessibility of the networked device may include information identifying that the networked device is presently accessible. The information identifying present accessibility of the networked device may include information identifying that the networked device is presently not accessible. Establishing connection with the networked device further may include establishing a connection with a server that leverages an existing connection with the networked device.

In another general aspect, a mobile unit according to the present application is configured for remotely controlling wirelessly networked devices. The mobile unit includes a processing device and a memory storing executable instructions for causing the processing device to receive, at a mobile unit and from a user, an input, analyze the input to identify a networked device associated with the input, determine whether the networked device is presently accessible via a wireless network, and determine whether to establish a connection with the networked device based on whether the networked device is determined to be presently accessible via the wireless network. The memory also stores executable instructions for causing the processing device to establish a connection with the networked device if it is determined that the networked device is accessible via the wireless network, identify the capabilities associated with the networked device; and enable the user to interact with the networked device through the mobile unit by selecting from among at least two capabilities associated with the networked device.

In another general aspect, a mobile unit according to the present application is configured for remotely controlling a networked device via a mobile device. The mobile unit includes identifying, at a mobile device and over a wireless network, a subset of networked devices presently accessible via the wireless network, identifying capabilities associated with at least one networked device accessible over the wireless network included in the identified subset, and displaying, on the mobile device, a user interface configured to receive an input associated with the identified capabilities associated with the at least one networked device, wherein the identified capabilities relates to functions performed by the at least one networked device. The method further includes receiving, at the mobile device and from a user, an input associated with the identified capabilities, identifying, from among the identified capabilities, a capability responsive to the input, and sending a command to the at least one networked device for controlling the responsive capability.

Implementations of the above general aspect may include one or more of the following features. For example, identifying the subset of networked devices may include identifying, at a wireless phone, the subset of networked devices presently accessible via the wireless network. Alternatively or additionally, identifying the subset of networked devices may include identifying, at a personal digital assistant, the subset of networked devices presently accessible via the wireless network. Alternatively or additionally, identifying the subset of networked devices may include identifying, at a portable e-mail device, the subset of networked devices presently accessible via the wireless network. The portable e-mail device may include a Blackberry or a Sidekick. Identifying the subset of networked devices may also include identifying, at a portable music player, the subset of networked devices presently accessible via the wireless network.

Identifying the capabilities associated with the at least one networked device may include receiving, at the mobile device and from the user, an input being related to controlling the at least one networked device and in response to the received input, identifying the capabilities associated with the at least one networked device. Alternatively or additionally, identifying the capabilities associated with the at least one networked device may include polling the at least one networked device to identify capabilities identified as being related to one or more functions supported by the at least one networked device and in response to polling the at least one networked device, receiving, at the mobile device, an indication of capabilities identified as being related to the one or more functions supported by the at least one networked device. Alternatively or additionally, identifying the subset of networked devices may include identifying all networked devices presently accessible via the wireless network.

Identifying the capabilities may also include accessing a database that includes capabilities associated with networked devices; excluding, from among the capabilities within the database, capabilities associated with networked devices that are not presently accessible on the wireless network, and identifying, from among the capabilities within the database, the remaining capabilities. Displaying the user interface may include displaying a limited menu option that enables the user to select, from among the identified capabilities, a desired capability. Alternatively or additionally, displaying the user interface may include displaying an input field that enables the user to specify a desired capability.

Implementations of the above general aspect also may include determining whether an additional input is needed for controlling the capability responsive to the user input, if it is determined that the additional input is needed, requesting, from the user, to provide the additional input, and upon receiving the additional input, converting the additional input into a command for controlling the capability responsive to the input.

Implementations of the above general aspect also may include determining whether additional input is needed for controlling the capability responsive to the user input and if it is determined that the additional input is not needed, converting the input into a command for controlling the capability responsive to the input.

Identifying capabilities associated with the at least one networked device further may include: (1) requesting, from the at least one networked device, the capabilities, (2) receiving, from the at least one networked device, the capabilities, and (3) presenting to the user the received capabilities. Requesting the capabilities may include requesting, from the at least one networked device, a subset of all available capabilities; receiving the capabilities may include receiving, from the at least one networked device, the subset of all available capabilities; and presenting to the user the received capabilities may include presenting to the user the received subset of all available capabilities. Requesting the subset of all available capabilities may include requesting the top five most popular, recently used, or favorite capabilities.

Implementations of the above general aspect also may include referencing a personal profile of the user to determine the top five most popular, recently used, or favorite capabilities. Alternatively or additionally, implementations of the above general aspect also may include referencing a demographic location of the user to determine the top five most popular, recently used, or favorite capabilities. Alternatively or additionally, implementations of the above general aspect also may include referencing attributes associated with a user group of the user to determine the top five most popular, recently used, or favorite capabilities.

Identifying capabilities associated with the at least one networked device further may include: (1) requesting, from an external server, the capabilities; (2) receiving, from the external server, the capabilities; and (3) presenting to the user the received capabilities. Requesting the one or more capabilities may include requesting, from the external server, the one or more capabilities either before or after determining the present accessibility of the at least one networked device. Requesting the capabilities may include requesting, from the external server, a subset of all available capabilities; receiving the capabilities may include receiving, from the external server, the subset of all available capabilities; and presenting to the user the received capabilities may include presenting to the user the received subset of all available capabilities. Requesting the subset of all available capabilities may include requesting the top five most popular, recently used, or favorite capabilities.

Implementations of the above general aspect also may include referencing a personal profile of the user to determine the top five most popular, recently used, or favorite capabilities. Alternatively or additionally, implementations of the above general aspect also may include referencing a demographic location of the user to determine the top five most popular, recently used, or favorite capabilities. Alternatively or additionally, implementations of the above general aspect also may include referencing attributes associated with a user group of the user to determine the top five most popular, recently used, or favorite capabilities.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

Figure 1:
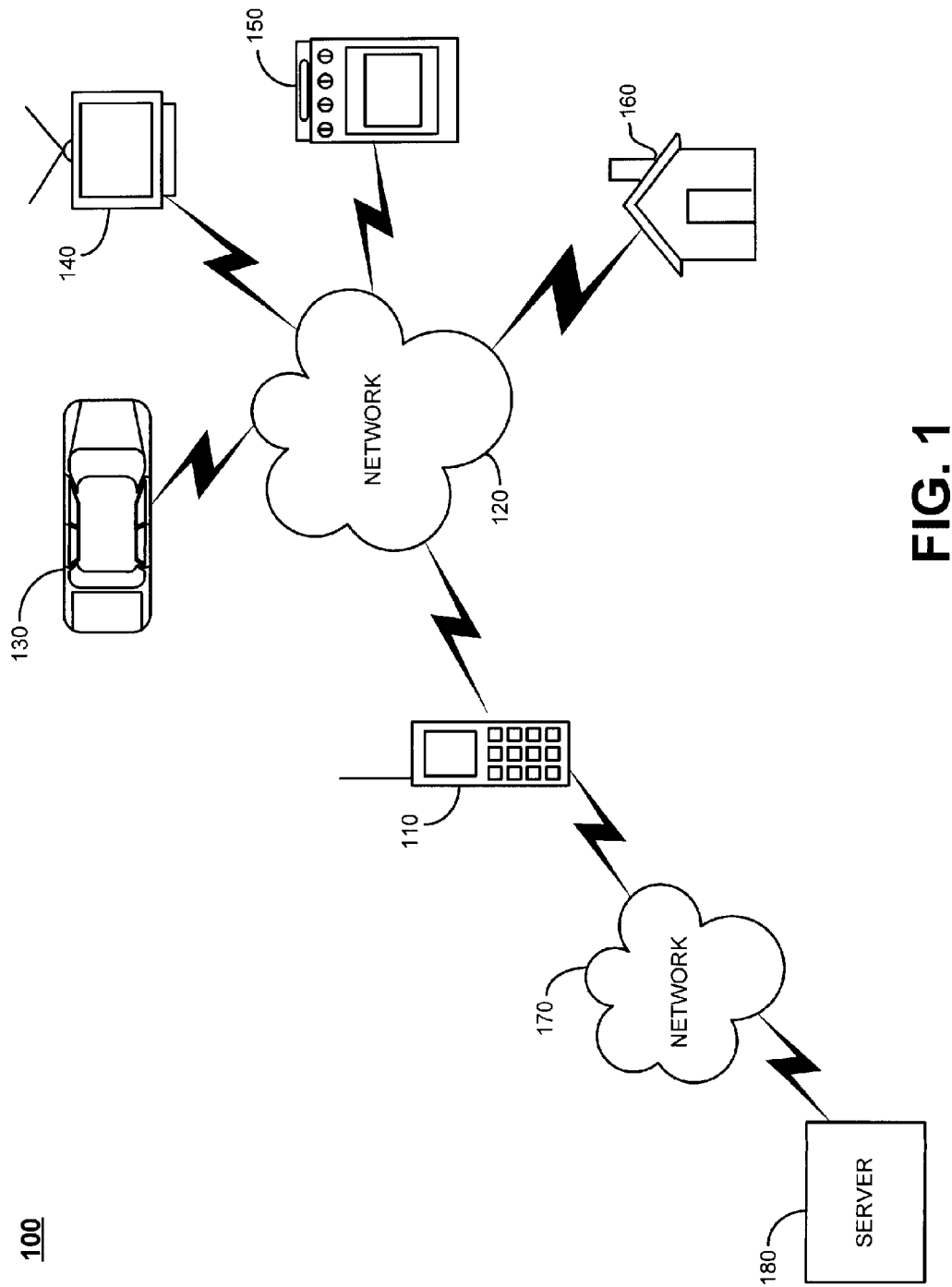
FIG. 1 is a block diagram of an exemplary communications system 100 that allows a mobile unit to remotely control one or more networked devices over a wireless network.

A mobile unit (e.g., a mobile phone) is configured to act as a remote control for one or more networked devices (e.g., an appliance, an audio/video equipment, and/or home systems). To this end, the mobile unit is configured to receive ambiguous (or unambiguous) input, to present the user with a list of choices satisfying the input, and to convert the selected choice from among the list of choices into a command for controlling the one or more networked devices. The command then may be transmitted, over the network and from the mobile unit, to the one or more networked devices.

In one implementation, described generally with respect to FIGS. 2A-2B and 3A-3B, the mobile unit detects presence of a networked device on a wireless network. The mobile unit polls the networked device to identify capabilities associated with the networked device. In response to polling the networked device, the mobile unit identifies the capabilities associated with the networked device. In some implementations, the mobile unit stores (indefinitely or for a limited amount of time) the identified capabilities in a capability cache. In other implementations, the mobile unit identifies the capabilities and immediately provides them to the user without short or long term storage. In either case, after presenting the capabilities to the user, the mobile unit may receive an input from the user in connection with one of the capabilities. Based on the received input, the mobile unit identifies a responsive capability and determines whether an additional input is needed for controlling the responsive capability. If not, the mobile unit converts the input into a command for controlling the responsive capability. And, the mobile unit submits the command to the networked device, instructing the networked device to carry out the command.

On the other hand, if the mobile unit determines that an additional input is required for controlling the responsive capability, the mobile unit solicits the user for the additional input and, upon receiving the same, the mobile unit submits the command to the networked device. For example, assuming the responsive capability relates to tuning a television to a particular channel, the mobile unit requests that the user provide a particular channel to which the television should be tuned. In one specific example, the user enters the input "35" to instruct the mobile unit to tune the television to channel 35. In response, the mobile unit 110 provides the command "tune television to channel 35" to a networked television device and directs the networked television device to change the channel to channel 35. In another example, the user inputs "up" or "down" to indicate that the mobile unit should command the television to tune to a higher or lower channel from the previously-viewed or presently-showing channel.

In another implementation, described generally with respect to FIGS. 4A-4C and 5A-5B, instead of first detecting the presence of a networked device on the network, polling its capabilities, and then waiting to receive an input from the user in connection with one of those capabilities, the mobile unit first receives an input from the user and in response to the received input attempts to identify the presence of a networked device associated with or capable of carrying out the input. To this end, the mobile unit is configured to display an interface for receiving an input from the user. The input may relate to a capability of a particular networked device. Alternatively, the input may directly identify the networked device with which the user wishes to interact. For instance, the input describes the name of the networked device with which the user wishes to interact. To this end, the user may manually enter the name of the networked device or may select the name of the networked device from among names of networked devices appearing on a pull-down menu.

In the scenario where the input directly identifies the networked device, the mobile unit establishes connection with the networked device and identifies the capabilities associated therewith. Thereafter, the mobile unit presents the capabilities to the user and allows the user to remotely control the networked device by controlling one or more of the presented capabilities.

In the scenario where the input relates to a capability associated with a networked device, the mobile unit identifies a responsive capabilities associated with the input. And, to control the responsive capability, the mobile unit transmits a command to the networked device associated with the responsive capability.

FIG. 1 is a block diagram of an exemplary communications system 100 that allows a mobile device to remotely control one or more networked devices over a wireless network. Below, the communication system 100 is described with reference to other illustrative figures, each of which is later described in more detail. The communications system 100 includes a mobile unit 110 configured to remotely control networked devices 130-160 through a network 120. The mobile unit 110 also is configured to remotely interact with a server 180 through a network 170.

The mobile unit 110 includes software that configures the mobile unit 110 to act as a remote control for the one or more networked devices 130-160. To this end and in one implementation, illustrated by FIGS. 2A-2B, 3A-3B, and 4A-4B, the mobile unit 110 is configured to receive, from a user, an input related to a capability of one of the networked devices 130-160. In response, the mobile unit 110 identifies a command based on the input and the networked device supporting the command. The mobile unit 110 then sends a request, over the network 120, to the identified networked device, directing the identified networked device to carry out the command the user requested. In this manner, the mobile unit 110 acts as a remote control for the networked device.

The mobile unit 110 includes, for example, a wireless telephone, a personal digital assistant ("PDA"), a messaging device (e.g., a pager), a text messaging or a portable e-mail device (e.g., a Blackberry® or a Sidekick®), a portable music player (e.g., an iPod®) or some other electronic portable messaging, entertainment, organization, or gaming device. FIGS. 3A-3B and 4A-4B illustrate examples of such a mobile unit. Regardless of the particular type of the mobile unit 110, the mobile unit 110 includes an interface for receiving an input from the user. The input may be associated with a capability of one of the networked devices 130-160. The mobile unit 110 identifies the capability and transmits a command associated with the identified capability to the one or more networked devices 130-160 in response to the received input.

The received input may be ambiguous or unambiguous. Whether ambiguous or unambiguous, the received input either directly identifies a networked device or identifies a capability associated with a networked device. An input is ambiguous if it is not clear from the input itself which particular capability, and/or which networked device, is being referenced, whereas the input is unambiguous if it is clear (or at least discernable) from the input itself (e.g., only that input) which particular capability and/or network device is being referenced. For example, an ambiguous input includes "CH" because it is not clear from the input what capability is being referenced, whereas, an unambiguous input includes, for instance, "TV CHANNEL" because it is clear from the input that the television channeling capability is being referenced. Another example of an ambiguous input includes series of numbers because by entering, for example, the input "2" the user may wish to input either "2," "A," "B," or "C." In such a case, the system (e.g., the mobile unit) takes the sequence of numeric numbers and generates a list of choices related to the entered numbers, as described in more detail in the U.S. application Ser. No. 11/177,477, filed Jul. 11, 2005 and entitled "Disambiguating Ambiguous Characters" the entire content which is incorporated herein by reference. For example, the system (e.g., the mobile unit 110) determines that the input "2273" relates to either "care," "base," or "card." As such, the system generates these choices for the user and requests, from the user, to select from among them. Similarly, the system may determine that the input "2273225" relates to "Baseball" and as such presents this option to the user.

Along these lines, when the received input is ambiguous, the mobile unit 110 ascertains the capability and/or the networked device associated with the input. To this end, the mobile unit 110 takes specific actions to identify the responsive capability and/or the networked device associated with the received ambiguous input. A capability and/or a networked device, for example, is responsive to the input if the capability and/or the networked device is a potential result that satisfies the ambiguous input (e.g. a capability "CHANNEL" is a potential result for the ambiguous input "CH" and a networked device "OVEN" is a potential result for the ambiguous input "OV"). Additionally or alternatively, a capability and/or a networked device is responsive to the input if the capability and/or the networked device is personalized for the ambiguous input by the user (e.g., a user may relate within the user' profile the ambiguous input "CN" to the channel "CNN" and the ambiguous input "OV" to the device "OVEN").

To identify the responsive capability associated with the received input, the mobile unit 110 may either (1) send the ambiguous input to one or more of the networked devices 130-160 and wait to receive possible matches from each recipient networked device 130-160; (2) send the ambiguous input to a server or an external device that stores aggregate capabilities associated with the networked devices 130-160 and request from the server or the external device to identify the responsive capabilities; or (3) reference the capabilities of the networked devices 130-160 and identify possible matches based on the referenced capabilities.

Referring to the first alternative and in keeping with the previous example, where the ambiguous input includes "CH," the mobile unit 110 sends the ambiguous input to the networked devices 130-160 and requests from the networked devices 130-160 for the responsive capabilities. In response, the mobile unit 110 may receive, for example, television "channeling" capability from the networked television device 140 and radio "channeling" capability from the networked automobile device 130. The mobile unit 110 presents the identified responsive capabilities to the user and requests that the user select from among them. For example, if the user selects the television "channeling" capability, the mobile unit 110 acts as a remote for the networked television device 140 to carry out the instructions associated with the channeling capability (e.g., increasing or decreasing the channels).

The second alternative is generally similar to the first alternative. A difference between the first and second alternative is that in the second alternative, a server or an external device has previously polled the capabilities associated with the networked client devices 130-160, and as such the server or the external device includes a database of aggregated capabilities. And, in response to the request, from the mobile unit 110, the server or the external device references this database to identify the responsive capability and to send the responsive capabilities to the user.

In the third alternative, rather than sending the ambiguous input to the networked devices 130-160, the mobile unit 110 references the capabilities of the networked devices 130-160 and the mobile unit 110 itself identifies the responsive capabilities. The third alternative is described in more detail with respect to FIGS. 4A-4C. As described with respect to FIGS. 4A-4C, in one implementation, the mobile unit 110 stores a list of aggregated capabilities associated with the networked devices 130-160, and the mobile unit 110 references this list to identify the responsive capabilities. In another implementation, the mobile unit 110, requests from the networked devices 130-160, the list of their capabilities and from the acquired list identifies the responsive capabilities.

Figure 5A:
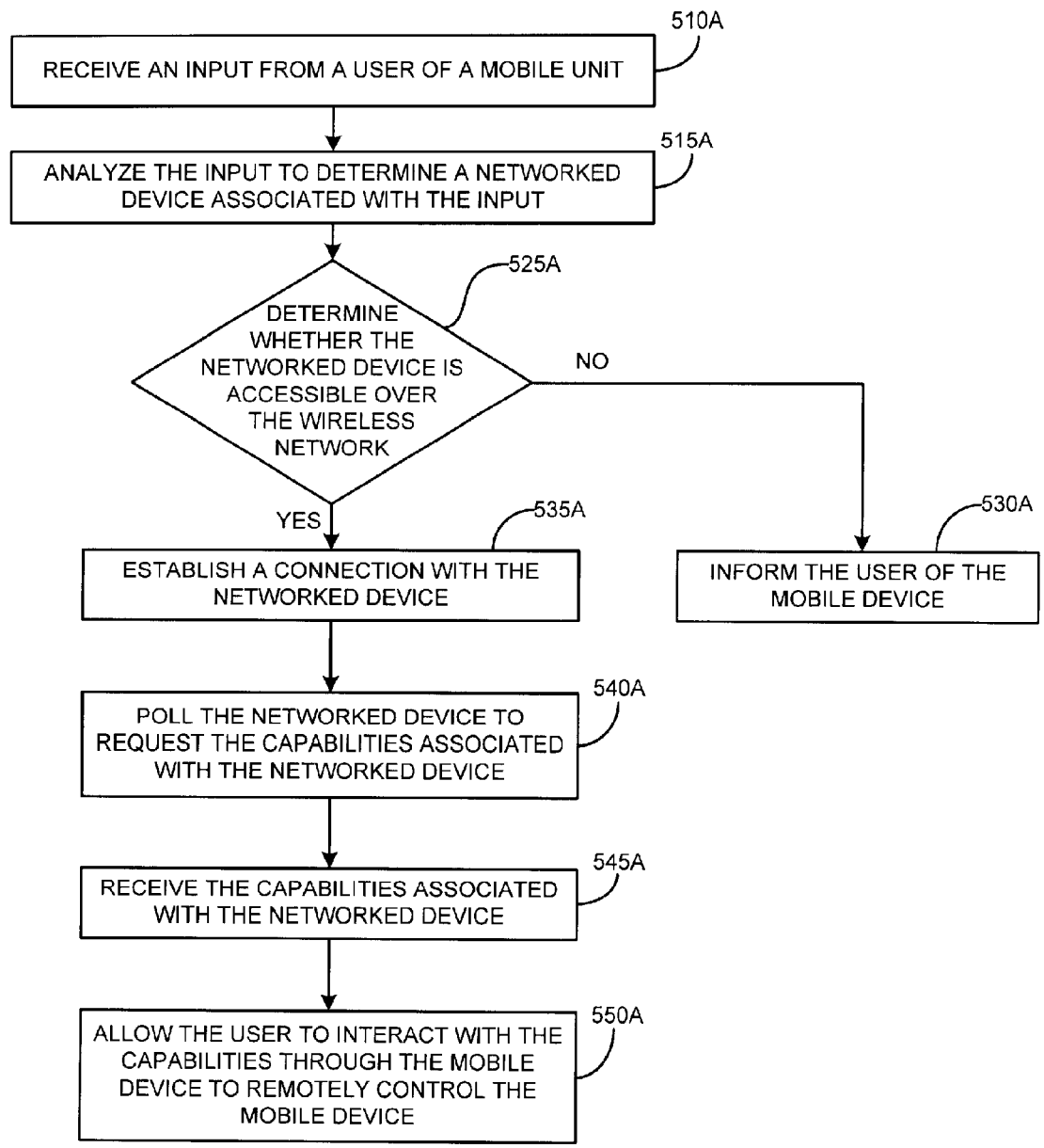
FIG. 5A illustrates an exemplary process that is used by a mobile unit to identify a networked device and its particular capabilities based on an input received from the user of the mobile unit.
Figure 5B:
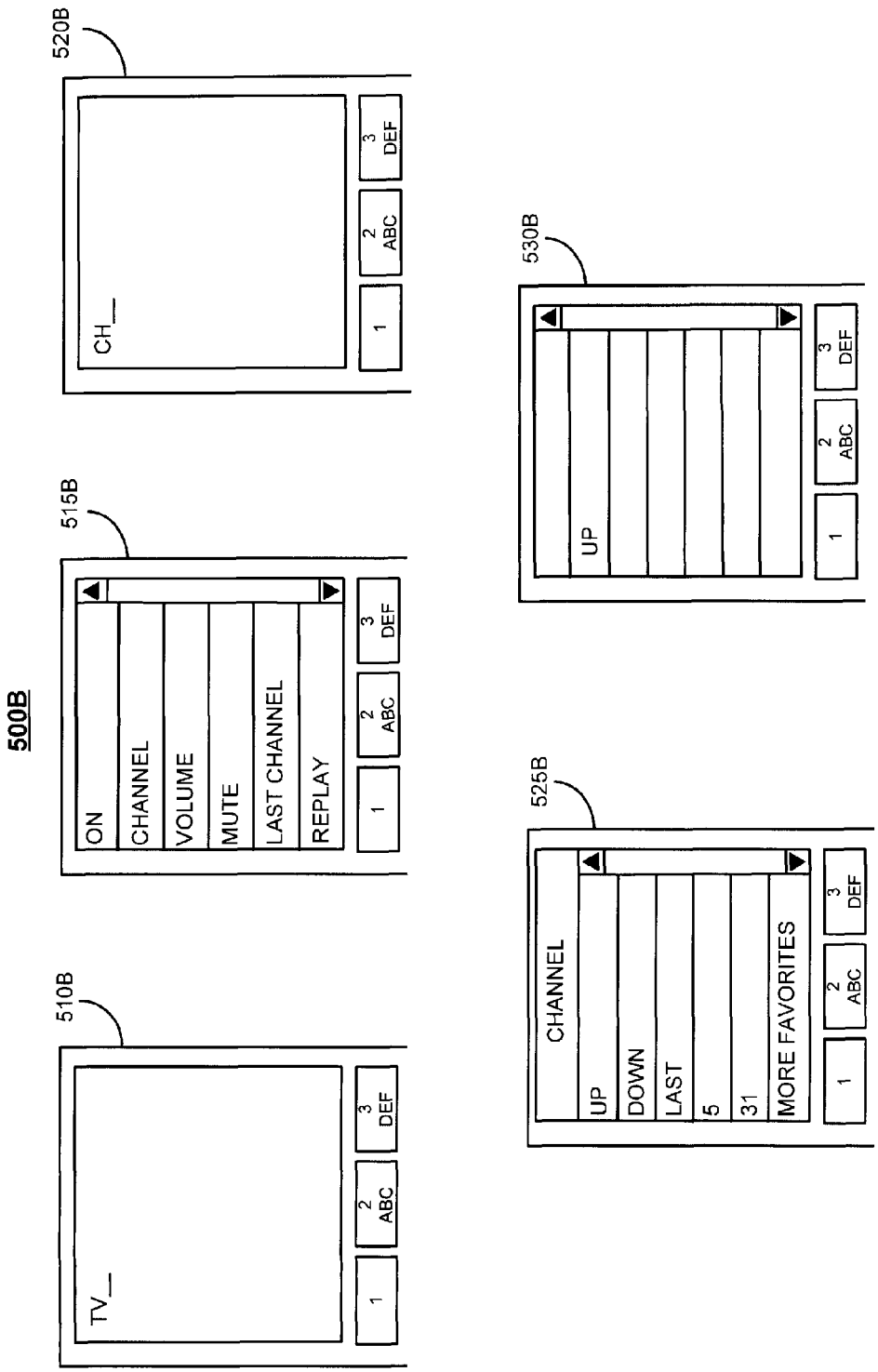
FIG. 5B illustrate, within several displays, an exemplary sequence of interactions between a mobile unit 110 and a user for remotely controlling a networked device.

Regardless of which of the above-described alternatives are used to identify the responsive capability associated with the ambiguous input (e.g., "CH"), the mobile unit 110 may be further configured to request, and receive, additional multimode input (ambiguous or otherwise) from a user related to controlling a particular responsive capability. For example, assuming the responsive capability associated with the ambiguous input "CH" relates to tuning a television to a particular channel, the mobile unit 110 requests that the user provide information related to a particular channel to which the television should be tuned. In one specific example, the user enters the input "35" to instruct the mobile unit 110 to tune the television to channel 35. In another example, the user inputs "up" or "down" to indicate that the mobile unit 110 should command the television to tune to a higher or lower channel from the previously-viewed or presently-showing channel. FIGS. 3B and 5B illustrate exemplary user interfaces configured to solicit the user and receive from the user more information in connection with a particular capability.

The mobile unit 110 is configured to communicate, through the network 120, with the client devices 130-160. In particular, the mobile unit 110 is configured to transmit, over the network 120, a command associated with the capability to the networked devices 130-160 in order to remotely control the networked devices 130-160. In keeping with the above-described example, the mobile unit 110 provides, over the network 120, the command "tune television to channel 35" to a networked television device 140 and directs the networked television device 140 to change the channel to channel 35.

Figure 6:
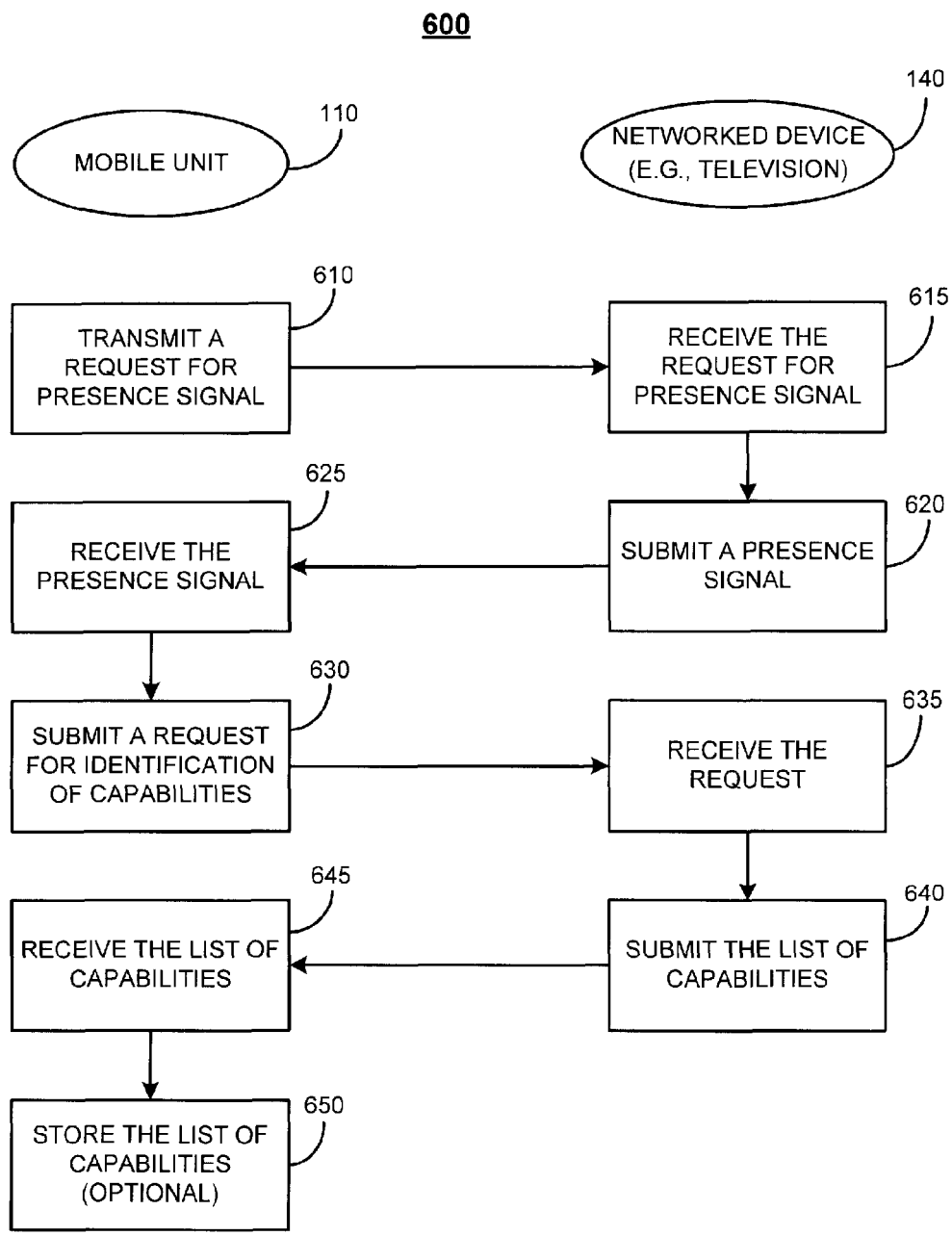
FIG. 6 illustrates an exemplary process used by a mobile unit to directly transmit a request for a presence signal to networked devices that are accessible via a network.
Figure 7:
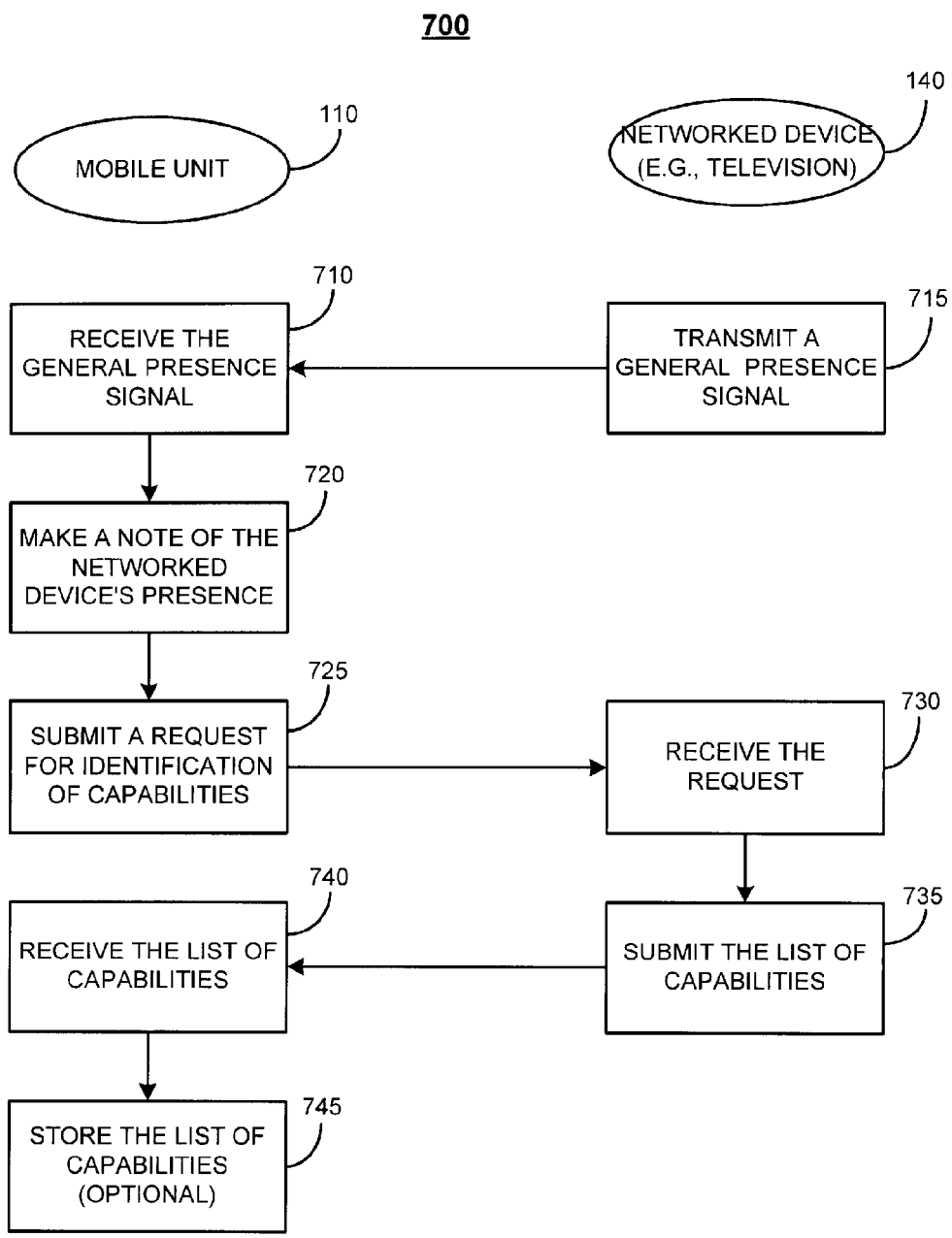
FIG. 7 illustrates an exemplary process used by a mobile unit to detect presence signal generated from networked devices without a request for the same.

The network 120 includes hardware and/or software capable of enabling direct or indirect communications between the mobile unit 110 and networked devices 130-150. As such, the network 120 may include a direct link between the mobile unit 110 and the networked devices 130-150, or it may include one or more networks or sub networks between them (not shown). Each network or sub network may include, for example, a wired or wireless data pathway capable of carrying and receiving data. Examples of the delivery network include a Local Area Network ("LAN") or a PAN. The physical layer of PAN network may include computer buses such as USB and FireWire, or wireless network technologies such as IrDA, Bluetooth, or other transmission media such as power-line networking. Although, certain delivery networks are described here, it should be understood that other delivery networks may be used for carrying communications between the mobile unit 110 and the networked devices 130-160. In addition to delivering the traffic between the mobile unit 110 and the networked devices 130-160, the network 120 also helps the mobile unit 110 to detect presence of the networked devices 130-160. FIGS. 6 and 7 illustrate exemplary processes used by the mobile unit 110 to detect the presence of the networked devices 130-160 through the network 120. In one implementation, illustrated by FIG. 6, the mobile unit 110 sends a request for a presence signal directly to one or more networked devices that is known to the mobile unit 110 (e.g., the networked device was previously detected on the network 120 or a device that mobile unit 110 expects to be available on the network 120) and waits for a response. In another implementation, illustrated by FIG. 8, a networked device periodically broadcasts, over the network 120, a presence signal, without the mobile unit 110 requesting the same.

The networked devices 130-160 may be of a variety of devices that are capable of responding to commands from the mobile unit 110. The command may include instructions for carrying out a particular action, in which case the networked device carries out the action. Alternatively or additionally, the commands may include a request for additional information, in which case the networked device provides the additional to the mobile unit 110. As shown in FIG. 1, the networked device 130 represents a vehicle-related system, such as, for example, an ignition system, a door or trunk lock, an alarm system, a stereo and/or an environmental control system. The networked device 140 represents audio/visual equipment, such as, for example, a television, a digital video disc ("DVD") player, a video cassette recorder ("VCR") player, a personal video recorder ("PVR") and/or a stereo system. The networked device 150 represents an appliance, such as, for example, an oven, a stovetop, a microwave, a steamer or slow cooker, a refrigerator, an icemaker, and/or a coffee/cappuccino maker. The networked device 160 represents a home-related system, such as, for example, a home alarm system, fire and smoke detectors, a panic button, a garage door opener, door locks, home lighting, and/or air conditioning controls. In addition, other networked devices (not shown) may be present on the network 120, such as, for example, office equipment (e.g., a personal computer, a monitor, a printer, a fax machine, and/or a copier), industrial equipment (e.g., a computer-controlled lathe, a printed circuit board assembly machine, or a stereo lithography apparatus), field equipment (e.g., an electric power station controller, an irrigation valve, or a windmill), or other networked devices that can be controlled remotely by, and provide information to, the mobile unit 110. In some implementations, a transaction-based networked device (e.g., a jukebox or a toll booth) may be remotely controlled by the mobile unit 110.

As noted above, each of networked devices 130-160 may be configured to broadcast their presence on the network 120. The networked devices 130-150 also may be configured to receive and respond to inquiries from the mobile unit 110 (or some other device, e.g., a remote client or host set to organize or maintain the devices on network 120) and receive and respond to commands, from the mobile unit 110, for controlling a capability of the networked device.

The networked devices 130-160 may be configured to respond to an inquiry, from the mobile unit 110, for capabilities associated with the networked devices 130-160 by, for example, providing a display of available capabilities. The available capabilities may include a list of five most recently-used capabilities and/or favorite capabilities associated with a particular user. In one specific example, the networked device 150 (e.g., an oven) receives, from the mobile unit 110 and over the network 120, a request for information regarding available capabilities. The networked device 150 responds to mobile unit 110 with a list of all available capabilities (e.g., oven on/off, bake, broil, temperature setting, and timer), a subset of all available capabilities (e.g., oven on/off and temperature setting), or a list of all (or some number of) recently used capabilities or favorite capabilities associated with a particular user.

To determine capabilities that are favorites of the particular user, or capabilities that were most recently used by the particular user, the user of the mobile unit 110 may log in or provide some other identification-related information to the mobile unit 110. In one implementation, upon being activated, or upon returning from an idle state, the mobile unit 110 may request that a particular user supply a password or merely select the user's name from a list of all users that have access to the mobile unit 110, in order for the mobile unit 110 to determine an identity of a current user. Additionally or alternatively, the mobile unit 110 may determine an identity of the user based on the user's interaction with the mobile unit 110, or may be capable of generating a unique identification key similar to a web "cookie" that can be used to identify the user transparently and/or anonymously.

In the implementations where the mobile unit 110 presumes the user's identity, the mobile unit 110 may seek confirmation from the user. For example, the mobile unit 110 displays to the user (e.g., "I think you are Tom") and requests correction if the presumption is incorrect.

After the user's identity is determined, the mobile unit 110 references a table that includes preferences information for the determined identity. For example, the table includes information indicating that a favorite capability associated with user "Tom" is "tune TV to ESPN." The table may be stored internally at the mobile unit 110. Additionally or alternatively, the table may be stored externally, such as, for example, at a remote server or at one of the networked devices 130-160. For instance, each of the networked devices 130-160 may store preferences of the user in connection with that device.

Moving forward and in addition to responding to inquires from the mobile unit 110, the networked devices 130-160 may be configured to receive, from the mobile unit 110 over the network 120, a command associated with controlling a capability of the networked device. In keeping with the previous example, the networked oven device 150 may receive a command to set the oven temperature to 350 degrees. In response, a controller may cause the oven temperature to be set to 350 degrees, as described below in more detail. To this end, the networked devices 130-160 may be "smart" networked devices in that each networked device may include a smart component. The smart component of the networked devices 130-160 may be a general-purpose computer having a central processor unit (CPU), and memory/storage networked devices that store data and various programs, such as an operating system and one or more application programs. Other examples of the smart component of the networked devices 130-160 may include a workstation, a server, a special purpose device or component, a broadcast system, other equipment, or some combination thereof that is associated with the networked devices 130-160 and is capable of responding to and executing instructions in a defined manner. The smart component of the networked devices 130-160 also may include an input/output (I/O) device (e.g., video and audio input and conversion capability), and peripheral equipment, such as a communications card or device (e.g., a modem or a network adapter) for exchanging data with the network 120.

The networked devices 130-160 are generally capable of executing instructions under the command of a controller that is configured to receive commands from the mobile unit 110, to send information to the mobile unit 110, and to send instructions to the networked devices 130-160. In one example, the networked devices 130-160 encompass both wired and wireless Personal Area Network ("PAN"), and a wired and wireless local area network ("LAN") or wide area network ("WAN"). Alternatively or additionally, the networked devices 130-160 may encompass devices that are connected together but are not necessarily equipped with the OSI routing layer. The controller may be implemented by a software application loaded on the smart component of the networked devices 130-160 for commanding and directing communications exchanged with the mobile unit 110. Other examples of the controller include a program, a piece of code, an instruction, a device, a computer, a computer system, or a combination thereof, for independently or collectively instructing the mobile unit 110 or the smart component of the networked devices 130-160 to interact and operate as described. The smart component of the networked devices 130-160 may be embodied permanently or temporarily in any type of machine, component, physical or virtual equipment, storage medium, or propagated signal capable of receiving commands and requests for information from the mobile unit 110, providing the mobile unit 110 with information and providing instructions to the networked devices 130-160.

In addition to being in communication with the networked devices 130-160, the mobile unit also is in communication with the server 180 through the network 170. The network 170 includes hardware and/or software capable of allowing direct or indirect communications between the mobile unit 110 and the server 180. As such, the network 170 may include direct link between the mobile unit 110 and the server 180, or it may include one or more networks or sub networks between them (not shown). Each network or sub network may include, for example, a wired or wireless data pathway capable of carrying and receiving data. Examples of the delivery network include the Internet, the World Wide Web, a WAN, a LAN, analog or digital wired and wireless telephone networks, radio, television, cable, satellite, a short range wireless connectivity standard (e.g., Bluetooth), power-lines, infrared and/or any other delivery mechanism for carrying data.

The server 180 is configured to store information related to the networked devices 130-160. In one example, the server 180 is considered a proxy or a remote control host that enables network functionality or WAN for devices that lack network capability or Internet/WAN network capability. The server 180 may store information such as, for example, capabilities associated with the networked devices 130-160, and may provide, over the network 170 (e.g., the Internet), these capabilities to the mobile unit 110.

Figure 2A:
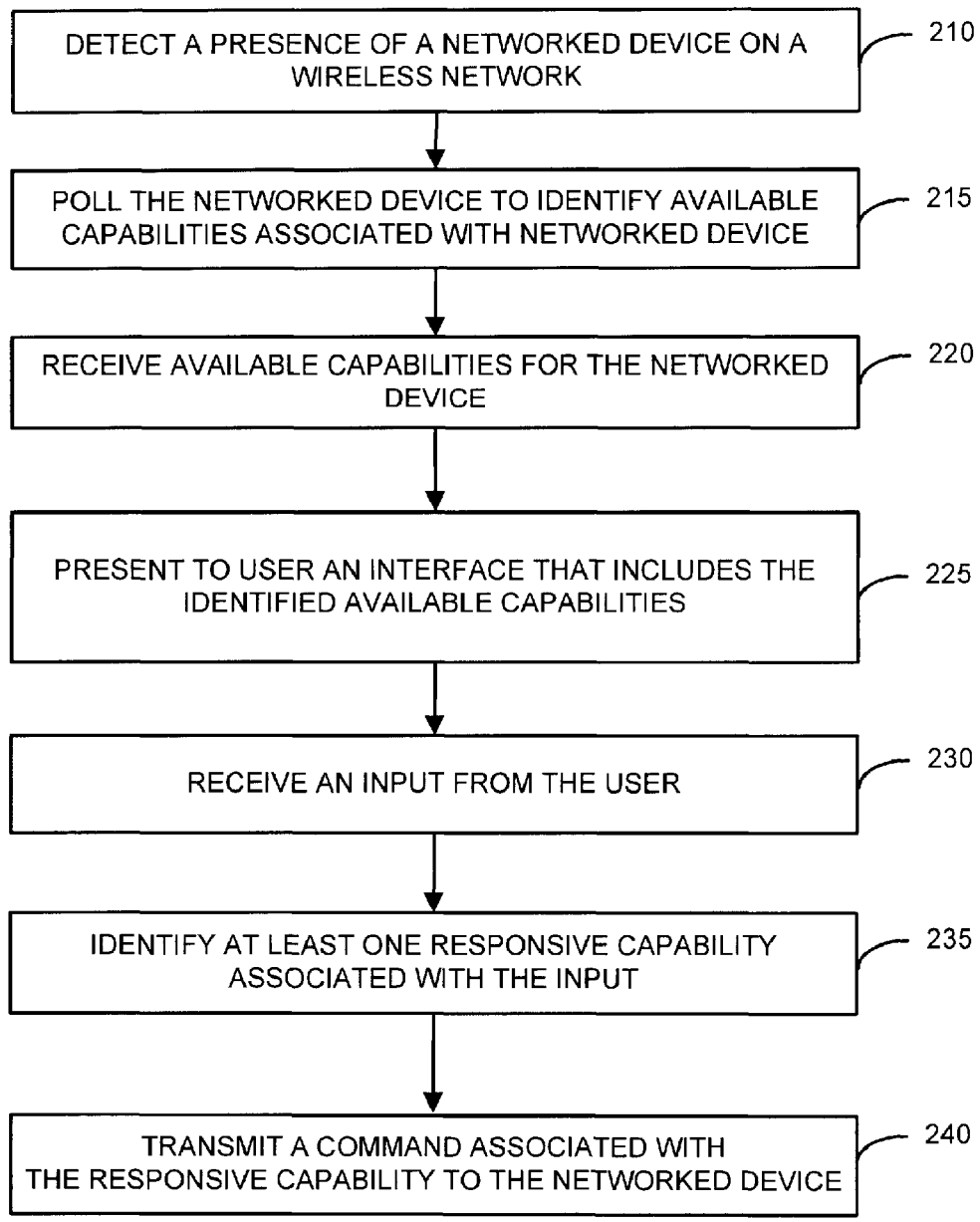
FIG. 2A illustrates an exemplary process used by a mobile unit to remotely control a networked device.
Figure 3A:
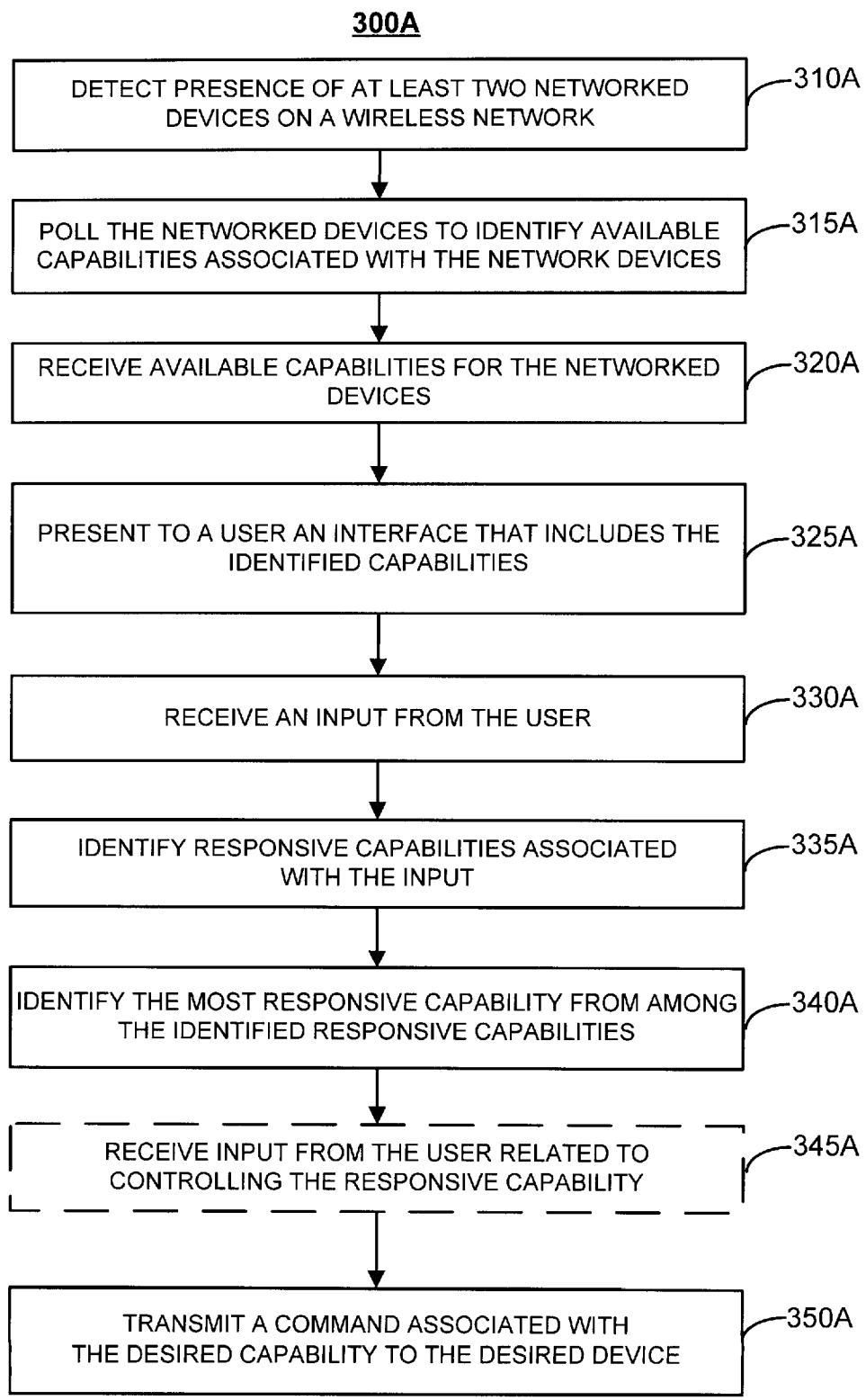
FIG. 3A illustrates an exemplary process used by a mobile unit to remotely control multiple networked devices.
Figure 3B:
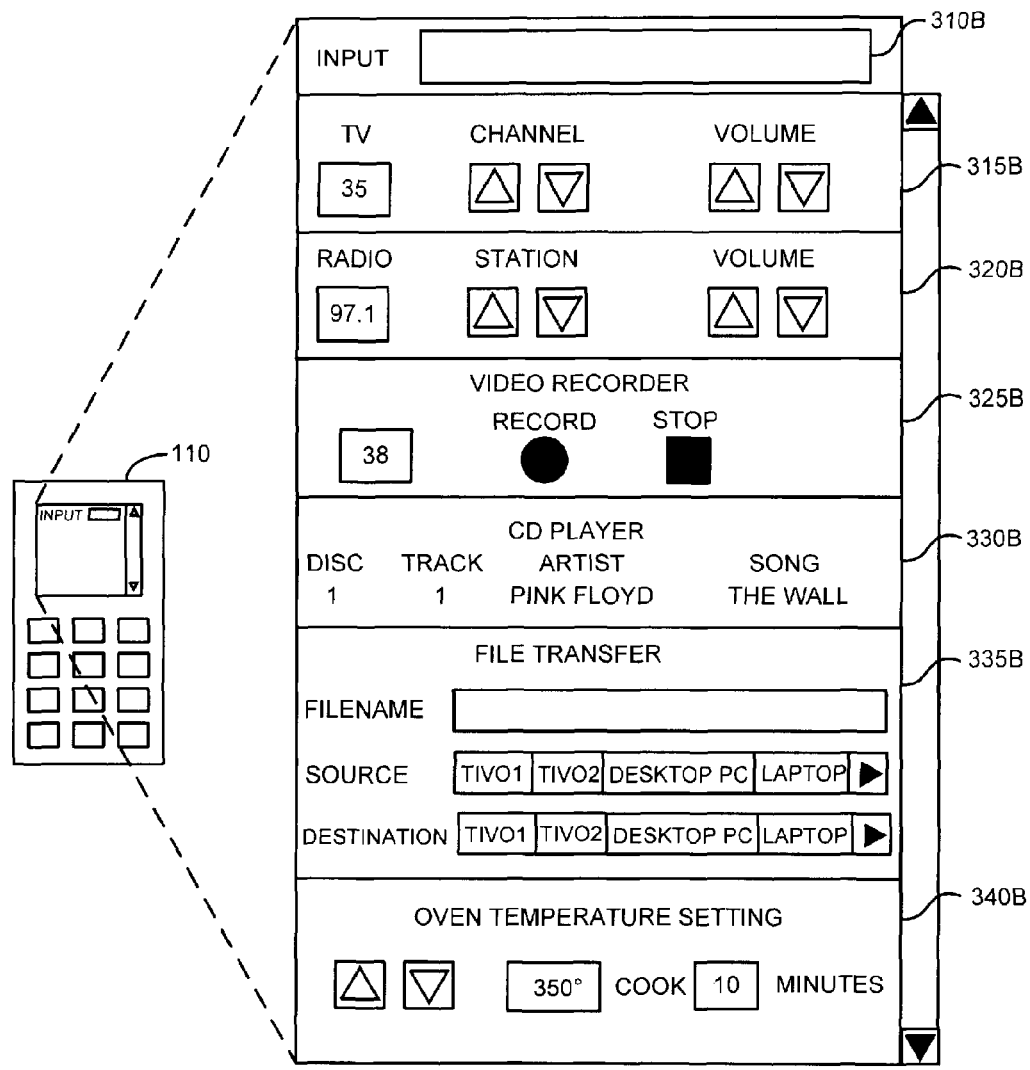
FIG. 3B illustrates an exemplary user interface for a mobile unit that is configured to display to a user capabilities associated with one or more networked devices present on a network.

FIGS. 2A and 3A illustrate exemplary processes 200A and 300A used by a mobile unit to remotely control one or more networked devices. For ease of reference, process 200A is described below in detail, and redundant aspects of the process 300A are not discussed.

FIG. 2A illustrates an exemplary process 200A used by a mobile unit to remotely control a networked device. In keeping with the previous examples and for convenience, particular components described with respect to FIG. 1 are referenced as performing the process 200A. More particularly, the process 200A involves the mobile unit 110, the network 120, and one or more of the networked devices 130-160. It should be noted that the components that are referred to as performing the process are for illustrative purposes only. In some implementations, other components, or a different combination of components within a system, may instead perform the process 200A.

The process 200A includes the mobile unit 110 detecting a presence of a networked device on the wireless network 120 (210). The networked device may be, for example, one of the networked devices 130-160 described with respect to FIG. 1 (e.g., audio/visual equipment, appliances, a home security system, home lighting, home environment controls, automobile controls, or office equipment). In keeping with the example described with respect to FIG. 1, the mobile unit 110 detects the presence of the networked television device 140 as described below in more detail with respect to FIGS. 6 and 7.

After detecting the presence of the networked television device 140, the mobile unit 110 polls the networked television device 140 to identify available capabilities associated with the networked device (215). For example, the mobile unit 110 requests that the networked television device 140 transmit, via the network 120, a list of all available capabilities to the mobile unit 110. In another example, the mobile unit 110 requests that the television 140 transmit a subset of all available capabilities to the mobile unit 110. For instance, the mobile unit 110 requests a list of the top five most popular, recently used, or favorite capabilities. The most popular, recently used and favorite capabilities may be determined with reference to a particular user, as described above. In yet another example, the mobile unit 110 requests that the networked television device 140 transmit a list of capabilities that correspond to or otherwise relate to a received input, as described in more detail below.

In either case, the mobile unit 110 receives a list of all or a subset of all capabilities for the networked television device 140 (220). For example, the mobile unit 110 receives an indication of a channel selection capability and a volume control capability from the networked television device 140. The mobile unit 110 then presents to a user an interface that includes the identified capabilities (225). Referring also to FIG. 3B, the interface includes command interface configured to, among others, allow the user to increase or decrease a channel or volume associated with a television channel that is currently shown. The interface also includes an input field configured to receive an input from the user.

Through the input field, the mobile unit 110 receives an input from the user (230). As noted above, the input may be ambiguous or unambiguous. The ambiguous or unambiguous input may be provided by the user via, for example, T9 using a reduced keypad or some other input mechanism. The input may be ambiguous in that it includes a series of letters and/or numbers (e.g., "OV") that do not correspond to any known complete title of a networked device or capability. Alternatively or additionally, the input may be ambiguous in that it includes a complete title of a networked device (e.g., "TV") or capability (e.g., "RECORD"), but that the capability for the networked device or networked device for the capability cannot be readily discerned from the input itself. Alternatively or additionally, the input may be ambiguous in that it has multiple textual interpretations (e.g., speech recognition of "cartoon", "CAR, TUNE", and "Khartoum"), it is a sequence of inputs that each have multiple equally-likely interpretations (e.g., the key sequence 8-8 on a standard mobile phone may represent "88", "TV", or the beginning of "TUNE"), or it is a sequence of inputs that each have more-or-less-likely interpretations (e.g., the "o" may be the best interpretation of a letter written on a mobile device touchscreen, but "a" and "e" are also possible; or the user pressed the "S" key on a small keyboard but may have intended to press one of the adjacent keys such as "A", "D", or "W").

In keeping with the example described with respect to FIG. 1, the user may provide an ambiguous input that includes the letters "C" and "H." The user may intend this input to represent a channel control capability of the networked television device 140. To disambiguate the input, the mobile unit 110 identifies at least one responsive capability associated with the input (235). For example, the mobile unit 110 identifies a television channeling capability that displays programming channels from the Cable News Network associated with the input "CH."

In one implementation, based on the user-entered ambiguous input, the mobile unit 110 may identify multiple responsive capabilities. For example, if the ambiguous input includes the letters "C" and "O," the mobile unit 110 identifies color temperature capability and the contrast as the two responsive capabilities. In this scenario, the mobile unit 110 identifies the most candidate capabilities to the ambiguous input by referencing a number of sources. For instance, the mobile unit 110 (1) references a list (stored within the mobile unit 110 or at some remote location, such as, for example, the networked server 180 or on one or more of the networked devices 130-160) of most recently requested capabilities, (2) polls the networked devices 130-160 for a list of most recently used capabilities for each networked device, and/or (3) refers to a user profile (stored within the mobile unit 110 or at some remote location) associated with the user to determine a capability that is most likely intended by the user based on the input (e.g., a user profile may indicate that the user's favorite or most often used networked device is the living room television). The user profile may include additional information such as user's social network and user's activities, which the mobile unit 110 may also use to resolve the responsive capabilities. Alternatively or additionally, the mobile unit 110 may glean demographic or other information known about the user and based on such information determines the responsive capabilities.

Figure 2B:
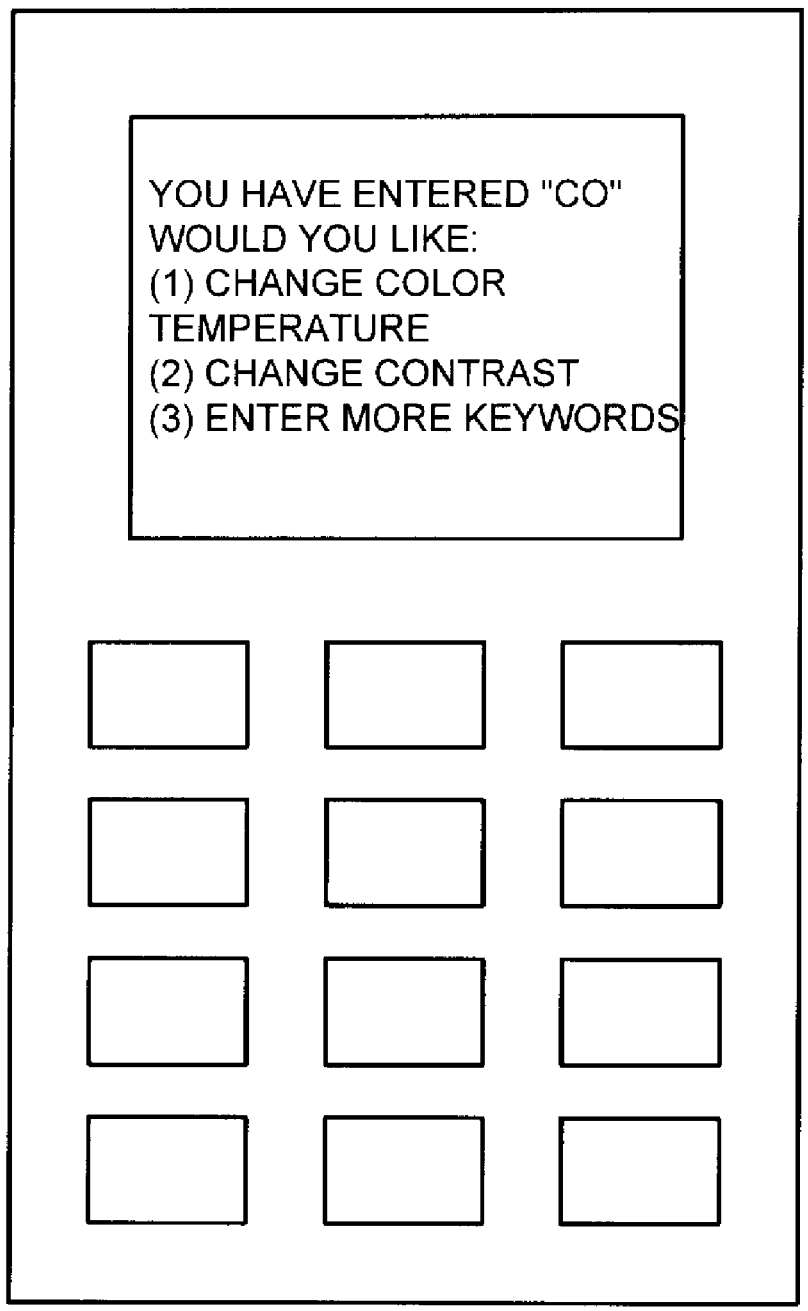
FIG. 2B illustrates an exemplary user interface including capabilities responsive to a user input.

Upon referencing various sources, the mobile unit 110 may, for example, determine that the most responsive capability of the two identified responsive capabilities (e.g., color temperature and contrast) is the color temperature capability. Additionally or alternatively, the mobile unit 110 may provide the user with each of the identified responsive capabilities and solicit, from the user, a selection from among the identified responsive capabilities. For example, the mobile unit 110 presents to the user a list, including the identified responsive capabilities of (1) color temperature and (2) contrast. FIG. 2B illustrates an exemplary user interface 200B that includes such a list. The mobile unit 110 then receives, from the user, a selection of one of the identified responsive capabilities. The user may provide the selection by, for example, scrolling to one of the capabilities and selecting an "enter" or "ok" control, entering a number associated with a capability (e.g., typing "1" for color temperature control), and/or submitting an additional ambiguous input (e.g., inputting "CON" for the television contrast control).

The mobile unit 110 optionally receives input from the user related to controlling the responsive capability. In some situations, the responsive capability may represent a command that may be transmitted to, and understood by, the networked device without additional input from the user. For example, the responsive capability may be "tune to CNN." In other situations, the responsive capability may represent a type of command that requires more information before the command may be transmitted to, and understood by, the networked device. For example, the responsive capability may be "television channel control." This responsive capability represents a type of capability, rather than a particular command. Thus, before a command may be sent to the networked device, the mobile unit 110 may request that the user supply additional information, such as, for example, a particular channel to which the user desires to tune the television, to control the capability.

To do so, the mobile unit 110 may provide the user with a command interface that includes a channel up/down control and/or the ability to type in a channel number or name using an ambiguous (or non-ambiguous) input. In some implementations, the mobile unit 110 allows the user to provide the name of a television show, and in response, the mobile unit 110 determines (based on information stored within the mobile unit 110 or at a remote location) a television channel on which the television show is (or will be) displayed.

After determining the command, the mobile unit 110 transmits the command associated with the responsive capability to the networked television device 140 (240). For example, the mobile unit 110 transmits a particular channel (e.g., channel 35, a channel corresponding to the CNN station, or a channel that is presently broadcasting the television show "American Idol") to the networked television device 140 and commands the networked television device 140 to tune to that channel.

FIG. 3A illustrates an exemplary process 300A used by a mobile unit to remotely control multiple networked devices. In keeping with the previous examples and for convenience, particular components described with respect to FIG. 1 are referenced as performing process 300A. More particularly, process 300A involves the mobile unit 110, the network 120, and at least two of the networked devices 130-160. It should be noted that the components that are referred to as performing process 300A are for illustrative purposes only. In some implementations, other components, or a different combination of components within a system, may instead perform process 300A.

Process 300A includes the mobile unit 110 detecting a presence of at least two networked devices on the network 120 (310A) in a manner similar to that described above with respect to action (210) of FIG. 2A. In one specific example, the mobile unit 110 detects the presence of multiple networked devices, such as, the networked television device 140 and the networked oven device 150.

The mobile unit 110 polls the networked devices to identify available capabilities associated with each of the networked devices (315A). To this end and to keep with the above-describe example, the mobile unit 110 requests that the detected networked television device 140 and the networked oven device 150 each transmit a list of all available capabilities. Additionally or alternatively, the mobile unit 110 may request that the networked television device 140 and the networked oven device 150 each transmit a subset of all available capabilities. In yet another example, the mobile unit 110 requests that the networked television device 140 and the networked oven device 150 transmit a list of capabilities that correspond with a received input, as described in more detail below.

In one scenario, after the initial detection of the at least two networked devices (310A), the mobile unit 110 continues to monitor the network 120 for the presence of additional devices. And, upon recognition of the same, the mobile unit 110 requests, from the additional networked devices, for their available capabilities. The request may be made along with or after the request to the networked television device 140 and the networked oven device 150 for their available capabilities.

The mobile unit 110 receives a list of available capabilities for the networked devices (e.g., the networked television device 140 and the networked oven device 150) (320A). For example, the mobile unit 110 receives, from the networked television device 140, an indication of a channel selection capability and a volume control capability. Similarly, the mobile unit 110 receives, from the networked oven device 150, on/off capability and temperature control capability. The mobile unit 110 then presents to a user an interface that includes the identified capabilities (325A). For instance, in the example shown by and later discussed with respect to FIG. 3B, an interface 300B includes a command interface configured with various controls, one of which is configured to allow the user to increase or decrease a channel or volume associated with a television channel that is currently shown, and another of which is configured to allow the user to change the temperature settings of the networked oven device 150.

Through those controls and other input fields, the mobile unit 110 receives input from the user (330A). For example, the mobile unit 110 may receive an ambiguous input that includes the numbers "3" and "5." The input "35" may be considered ambiguous because it is not readily apparent which networked device and/or capability the user wishes to control by the input "35." Indeed, the user may intend this input to represent a desire to tune the networked television device 140 to channel "35," set a cooking temperature on the networked oven device 150 to "35 degrees," or set a timer associated with the networked oven device 150 to "35 minutes."

Alternatively, the characters "3" and "5" also may be considered to be ambiguous because the characters "35", representing the ambiguous key input sequence 3-5 on a standard phone keypad, may be intended to refer to the letters "EJ," rather than the number "35." For example, the number "3" represents the letters "D," "E," or "F," in addition to representing the number "3," and the number "5" represents the letters "J," "K," or "L," in addition to representing the number "5." The letters "EJ" may be related to the capabilities of ejecting a CD or DVD from a networked CD player or DVD player associated with the networked television device 140, or ejecting a CD, DVD, disk or external hard drive from the home computer.

The mobile unit 110 identifies responsive capabilities associated with the ambiguous input (335A). To do so, the mobile unit 110 references the capabilities received from the networked devices detected over the network 120. For example, the mobile unit 110 references the capabilities of the networked television device 140 and the networked oven device 150. In this manner, the mobile unit 110 identifies a television channel control capability for tuning a television channel to station "35" as being associated with the ambiguous input "35." And, the mobile unit 110 identifies the ambiguous input "35" as "EJ" and as being associated with ejecting a CD or DVD from a networked CD player or DVD player associated with the networked television device 140 or a home computer.

From among the responsive capabilities, the mobile unit 110 identifies a desired capability or the most responsive capability (340A). To determine a capability that is most responsive to the ambiguous input, the mobile unit 110 may refer to a number of sources, as described above with respect to FIG. 2A. Upon referencing the various sources, the mobile unit 110, for example, determines that the most responsive capability of the set of identified capabilities (e.g., change the television channel, set the oven temperature or cooking time) is the television channel control capability.

Additionally or alternatively, the mobile unit 110 may provide the user with the responsive capabilities identified via action (335A) and solicit a selection from the user. For example, the mobile unit 110 displays to the user a list, including the capabilities of (1) tune to a television channel, (2) set oven temperature, (3) set oven cooking time, (4) eject home computer CD drive, (5) eject home computer DVD drive, (6) record television channel on digital video recorder ("DVR"), (7) web search, (8) play a song and (9) file transfer.

Along these lines, the mobile 110, either working independently or with an external server 180, may prioritize the presented capabilities within the list. In one implementation, the frequency of use for a [device/capability/command] determines the relative prominence with which the responsive capability is displayed. Specifically, information associated with how often the user has selected a particular capability is used to sort the responsive capabilities. Variations on frequency sorting may include decaying the weighted frequency over time. Specifically, the length of time that has elapsed since a previous selection may be used to revise the ordering that is rendered. Also, a list of high frequency capabilities may be maintained and used when sorting. Capabilities that have been used a threshold degree of times (particularly for a threshold length of time) may be elevated over other capabilities that have not been selected the threshold degree of times (or as many times as other results).

In one implementation, each instance in which an entry in the responsive capabilities is selected increments a frequency counter associated with the entry. The frequency counter affects the sorting of subsequent capabilities that are responsive to the input. After a threshold number of selections has been performed, or after a threshold amount of time, all the frequencies may be "aged" by subtracting or dividing the frequency by a constant number.

Also, the mobile unit 110 may use context information (e.g., time of day, day of week, location, last command issued, etc.) with the user's input to predict capabilities the user is likely to be interested in based on the user's past selection behavior. In some implementations, contextual information is used to sort which capabilities are even referenced by the analytic engine.

Further, the mobile unit 110 may use input weighted frequency to determine the likelihood that a candidate is related to the entered input. For example, a handwritten entry may be interpreted as intended to refer to either an 'e', 'c' or 'o' with probabilities of 0.6, 0.3, and 0.1, respectively. Capabilities matching an 'e' may be presented before or more prominently than capabilities matching a 'c' or an 'o.' Also, a weighted relevancy may be attached to items. For example, TV capabilities may be given a highly relevant weight, such as a 0.9, where oven capabilities may be given a lower weight, such as 0.1. Weighted relevancy may be used to determine the order or display of matching items. In various implementations, an n-best list is used which includes a list of potential interpretations of an ambiguous input, where each interpretation may be paired with a quantity indicating an input probability. The paired probabilities may be assigned by the analytic engine, or set to constants, as with the example above.

In addition, a predetermined or default order may be used to sort or display results. Also, a default order may be used as a secondary sorting criterion, such as, for example, used to distinguish between items of equal or similar relevance. For example, an alphabetic or chronological sorting may be used.

The above description includes various sorting and rendering techniques that may be used. Different implementations may use differing combinations of the above techniques. The mobile unit 110 can use a combination of the above techniques to display the list of capabilities that are responsive to the inputted sequence.

The mobile unit 110 then may receive, from the user, a selection of one of the listed capabilities. The user may provide the selection by, for example, scrolling to and highlighting one of the capabilities and selecting an "enter" or "ok" control, entering a number associated with a capability (e.g., typing "1" for television channel control), and/or submitting an additional input (e.g., inputting "TV" for the television channel capability).

The mobile unit 110 optionally receives an input from the user related to controlling the responsive capability (345A), as described above with respect to FIG. 2A. Before a command may be sent to the networked device (e.g., television) to change a channel, the mobile unit 110 may request that the user supply additional information, such as, for example, a particular channel to which the user desires to tune the television. To do so, the mobile unit 110 may provide the user with a command interface that includes a channel up/down control and/or the ability to type in a channel number or name using an ambiguous (or non-ambiguous) input.

Upon identifying the command, the mobile unit 110 transmits a command associated with the responsive capability to the networked device (350A). For example, the mobile unit 110 transmits to the networked television device 140 instructions to tune to a particular channel (e.g., channel 35).

To illustrate further, and with reference to the above implementations and example, FIG. 3B illustrates an exemplary user interface 300B for a mobile unit that is configured to display to a user capabilities associated with one or more networked devices present on a network. The user interface 300B may be presented on the mobile unit 110 as a result of process 300A. The user interface 300B includes a user input field 310B and results 315B-340B related to a command interface for controlling a capability of one or more networked devices 130-160. To allow for better perception of details, the user interface 300B of the mobile unit 110 is shown in a larger scale.

The input field 310B allows a user to perceive the ambiguous (or unambiguous) input that the user has entered by using, for example, a reduced-entry keypad, such as that found on a cellular phone. Additionally or alternatively, the ambiguous (or unambiguous) input may be entered by the user on full scale keypad, via a drop-down menu, or some combination thereof. However, as shown in FIG. 3B, the input field 310B is empty, indicating no input has been entered by the user. In this scenario, the mobile unit 110 may be configured to display a list of command interfaces related to capabilities, such as, for example, command interfaces for all available capabilities are displayed or command interfaces for the recently used or favorite capabilities are displayed.

The results 315B-340B show the beginning of a complete list of capability command interfaces for controlling capabilities of one or more networked devices 130-160. A scroll bar is included along the right edge of the results 315B-340B to indicate that more results may be displayed upon activation of the slider (in an upward or downward direction) by the user. In another different scenario, as illustrated by FIGS. 4B-4C, the displayed capabilities and/or networked devices may be responsive to an input entered within the input field 310B.

Each of the results 315B-340B includes a command interface configured to allow a user to interact with the capability and/or the device associated with that capability. For example, the result 315B includes a command interface for controlling television channel and volume capabilities. In this manner, the command interface allows the user to increase or decrease a channel or volume associated with the television that is currently showing channel 35, or volume level 35. The user may enter an input related to the result 315B (e.g., selection of "show more" control (not shown)), which may result in the mobile unit 110 displaying a list of additional television commands (e.g., power on/off, brightness or sleep timer) and allowing the selection of one or more of the additional commands.

To further illustrate, the result 320B includes a command interface for controlling a radio station and volume capabilities. In particular, the command interface of the result 320B displays a current (or last listened to) radio station, a station up/down control and a volume up/down control. The result 325B includes a command interface for controlling a DVR. The command interface of the result 325B displays a last television station from which content was recorded and a stop recording control. The result 330B includes a command interface for controlling a music (e.g., CD) player. The command interface of the result 330B displays a last-played musical track, a play control and a stop control.

The result 335B includes a command interface for transferring a file from one networked device to another networked device. The file to be transferred may include a text document, spreadsheet, music file, video file, and/or picture. As such, the command interface of the result 335B includes an input portion in which the user provides a filename of a file to be transferred.

The user may provide an ambiguous or unambiguous filename by selecting the filename from a drop-down menu, entering the filename or portions therefore via a reduced-entry keypad, and/or combination thereof. The command interface of the result 335B also includes an input related to a source of the file, and another input related to a destination for the file.

Recent source and destination devices may be provided to the user in a drop-down menu for selection, or the command interface may be configured to allow the user selection or identification of a source or destination device. The source and destination devices may include a DVR, a personal computer, a personal data assistant or other devices that are able to store electronic media and that are detected over the network 120. Once the user has selected the filename, source device and destination device, the mobile unit 110 may copy or move the desired file from the source device to the destination device.

Finally, the result 340B includes a command interface for controlling oven temperature. The command interface of the result 340B displays an increase oven temperature control (e.g., hotter) and a decrease oven temperature control (e.g., colder).

Although the results 315B-340B each include a special command interface for interaction with each of the detected networked devices 130-160, the command interfaces are exemplary and other implementations are contemplated. For example, instead of receiving capabilities in a form of command interfaces, the capabilities may be received in a simple text format. As such, the results 315B-340B display the capabilities in textual format and receive a command from the user in the same manner. In keeping with the television example, the capabilities are displayed without up/down arrows associated with increasing or decreasing the television's channel and volumes. Along these lines, the user may input the command by entering text within the input field 310B rather than interacting with the interfaces. To this end, the mobile unit 110 may have a logic to infer that the user text is associated with the particular device and command. In addition, the logic is able to infer from the command to get additional information, such as intuitive interfaces, if the user requests.

In another implementation, instead of first detecting the presence of the networked devices 130-160 on the network 120, polling their capabilities, and then waiting to receive an input from the user in connection with one of those capabilities as illustrated by FIGS. 2A and 3A, the mobile unit 110 first receives an input and in response to the received input attempts to detect the presence of a networked device associated with the input.

Figure 4A:
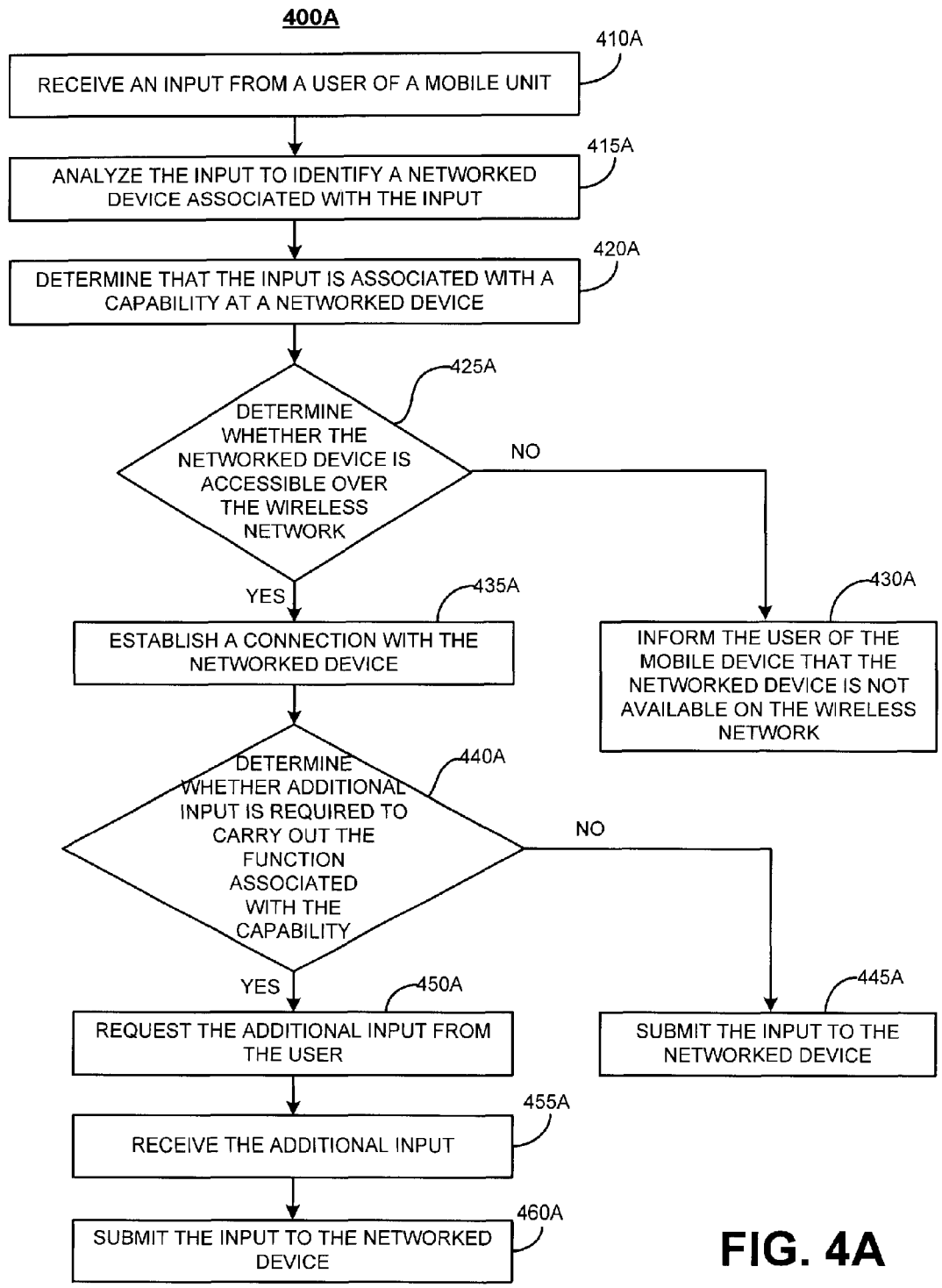
FIG. 4A illustrates an exemplary process for receiving, from a user of a mobile unit, an input and based on the received input identifying a capability associated with a networked device.
Figure 4B:
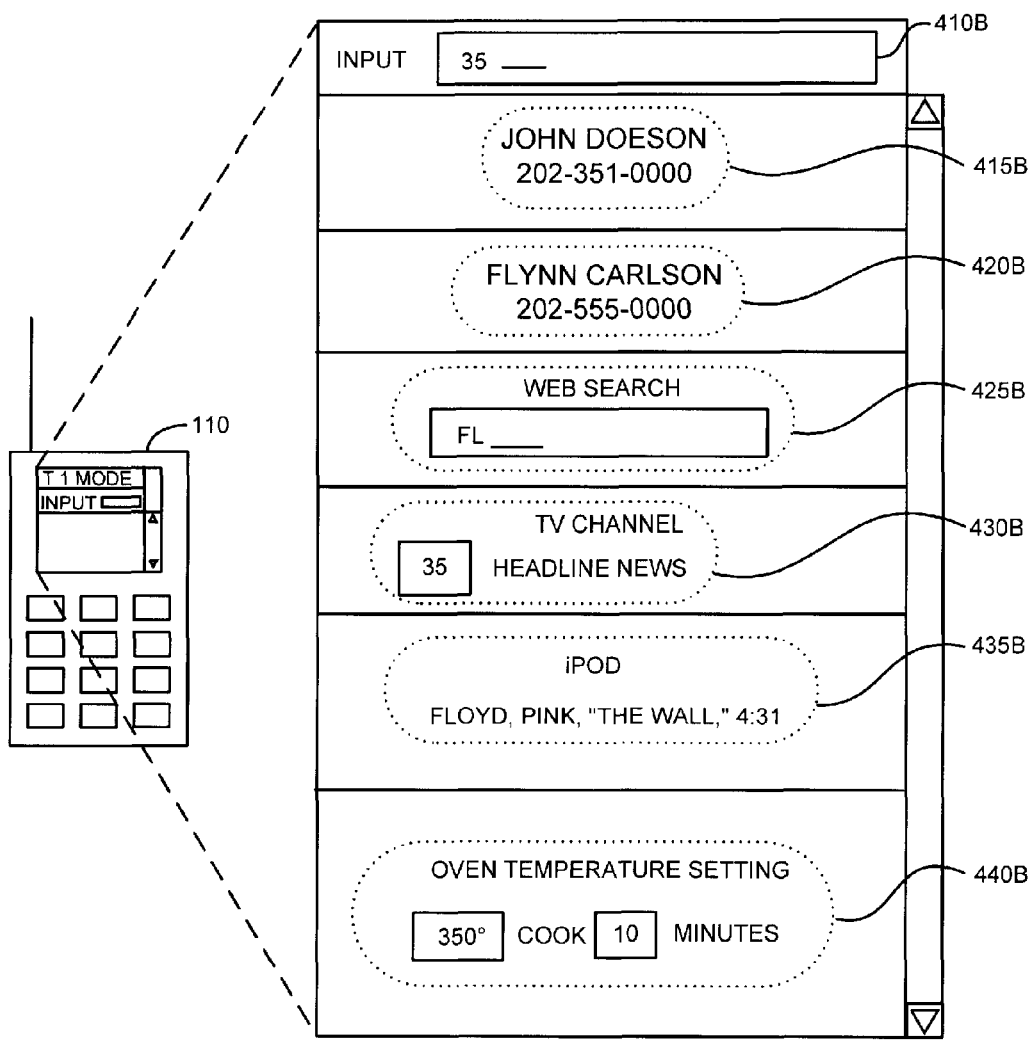
FIG. 4B illustrates an exemplary user interface that is configured to receive, within an input field and from a user, an input and to display results in response to the received input.
Figure 4C:
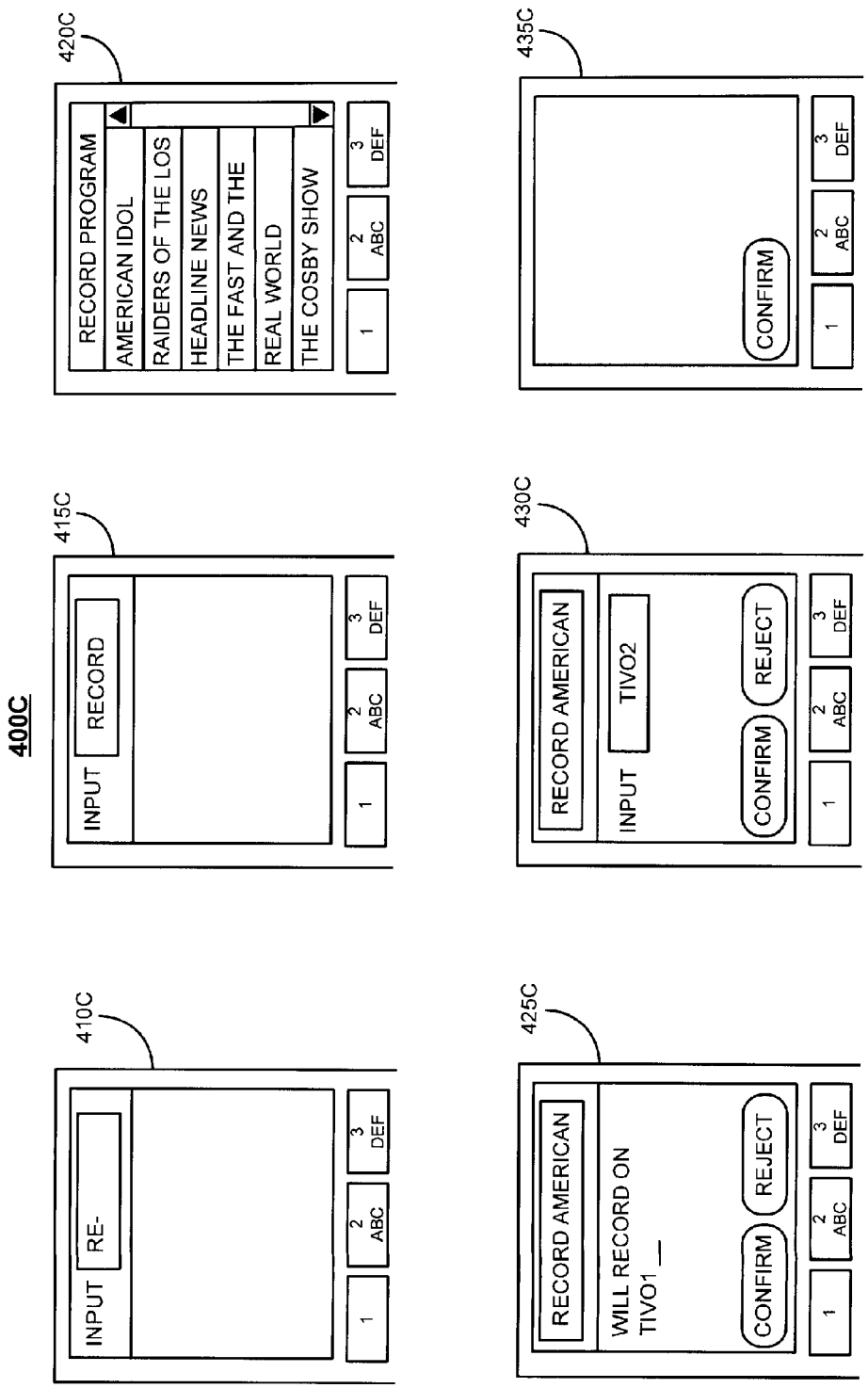
FIG. 4C illustrates, within several displays, an exemplary sequence of interactions between a mobile unit and a user for remotely controlling a networked device based on a determination of a capability associated with an input, and further determination of a networked device associated with the capability.

In one implementation, illustrated by FIG. 4A, the input describes a capability of a particular networked device. In another implementation, illustrated by FIG. 5A, the input directly describes the networked device with which the user wish to interact. For ease of reference, FIG. 4A is described below in detail, and the redundant aspects of the implementations shown in FIG. 5A are not discussed.

FIG. 4A illustrates an exemplary process 400A for receiving, from a user of a mobile unit, an input and based on the received input identifying a capability associated with a networked device. In keeping with the previous example and for convenience, the particular components described with respect to FIG. 1 are referenced in performing the process 400A. More particularly, for example, the process 400A is performed by the mobile unit 110.

Process 400A includes receiving, from a user of the mobile unit 110, an input (410A). As noted above, the input may be ambiguous or unambiguous. The ambiguous or unambiguous input may be provided by a user via, for example, T9 using a reduced keypad or some other input mechanism.

After receiving the input, the mobile unit 110 analyzes the input to identify a networked device associated with the input (415A). To carry out the analysis, in one implementation, the mobile unit 110 references an internal table which stores the name of the networked devices and capabilities associated therewith. In another implementation, the mobile unit 110 sends out the input to an external server (e.g., the server 180) that includes a list of networked devices and the capabilities associated therewith. In one example and as described in more detail below with respect to FIG. 4C, the mobile unit 110 receives an input "RE" from the user. The input "RE" may be an ambiguous input because it is not readily apparent what capability, or which networked device, the input is referencing. The mobile unit 110 may determine that the input "RE" relates to a "record" capability. In another example, the mobile unit 110 receives the ambiguous input "26." The ambiguous input "26" could have several possible textual meanings. For example, the number "2" may refer to letters "a," "b," or "c," whereas the number "6" could refer to letters "m," "n," or "o." And, their combinations may refer to "BE" in Beatles, "CE" in Cedric, "AF" in Aftenposten, or "AD" in Ads.

Regardless of whether the mobile unit 110 references an internal table or the external server 180 in resolving the input, the mobile unit 110 determines that the input is associated with a capability of a networked device (420A). In some implementations, the mobile unit 110 identifies multiple capabilities associated with the input. In keeping with the previous example described with respect to FIG. 1, the mobile unit may identify that color television capability and contrast capability of the networked television device 140 are both associated with an explicit input "CO" (or ambiguous input "26"). In such a scenario, the mobile unit 110 attempts to identify the user-desired capability from among the multiple capabilities. To do so, the mobile unit 110 may present the multiple identified capabilities to the user and ask the user to select from among them. Alternatively, the mobile unit 110 may reference the user's profile to determine which one of the multiple capabilities appears therein and selects that one.

Upon identifying the desired capability and the device associated with that capability, the mobile unit 110 determines whether the networked device is accessible over the wireless network 120 (425A). In doing so, in one implementation, the mobile unit 110 transmits a request for presence to the networked device and waits to receive a response from the networked device. If the mobile unit 110 does not receive a response within a threshold amount of time, the mobile unit 110 assumes that the device is not accessible over the network 120 and optionally informs the user of the same (430A). For example, the mobile unit 110 displays an interface to the user indicating that the desired networked device appears to be out of range from the current location of the user and requests that the user moves closer to the desired networked device.

If the networked device is present on the network 120, the mobile unit 110 establishes a connection with the networked device (435A). Additionally, the mobile unit 110 determines whether additional input is required to carry out a particular function associated with the capability (440A). Although, this action is shown to be performed after establishing a connection with the networked device, it should be understood that it can be performed before establishing a connection with the networked device. In either case, the mobile unit 110 may determine whether or not additional input is required by either referencing an internal or an external database.

If no additional input is required, the mobile unit 110 submits the input to the networked device (445A), and requests execution of the input. If, however, an additional input is required to control the capability, the mobile unit 110 requests, from the user, the additional input (ambiguous or otherwise) related to controlling the particular capability (450A). For example, assuming the particular capability associated with the ambiguous input "CH" relates to tuning a television to a particular channel, the mobile unit 110 requests that the user provide information related to a particular channel to which the television should be tuned. In one specific example, the user enters the input "35" to indicate channel 35, or the user inputs "up" or "down" to indicate that the mobile unit 110 should command the television to tune to a higher or lower channel from the previously-viewed or presently-showing channel.

The mobile unit 110 receives the additional input from the user (455A) and submits the input to the networked device (460A). In keeping with the previous example, the mobile unit 110 submits a request to the networked television device 140, instructing the networked television device 140 to tune the channel to channel 35.

FIGS. 4B and 4C illustrate exemplary user interfaces 400B and 400C, respectively, used to inform the user of the capabilities associated with the received input. FIG. 4B illustrates an exemplary user interface 400B that is configured to receive, within an input field and from a user, an input and to display results in response to the received input. The user interface 400B includes an input field 410B and results field 415B-440B. Similar to the input field described above with respect to FIG. 3B, the input field 410B is configured to allow the user to provide multimode (e.g., ambiguous or unambiguous) inputs. The mobile unit 110 analyzes the input and then presents results that are likely to be responsive to the input. The results relate to capabilities of one or more networked devices 130-160 with which the mobile 110 may communicate in order to remotely control them. To enable better perception of details, the user interface 400B of the mobile unit 110 is shown in a larger scale.

The input field 410B allows user perception of the characters that have been entered by the user using, for example, a reduced-entry keypad, such as that found on a cellular phone. In some implementations, the input (ambiguous or otherwise) may be entered by the user on a full-scale keypad, via a drop-down menu or some combination thereof. As shown, the input field 410B includes ambiguous characters "35," which have been entered by the user who pressed the keys labeled "3" and "5" on a reduced entry keypad associated with the mobile unit 110. The characters "3" and "5" are ambiguous in the sense that the number "3" may represent the letters "D," "E," or "F," in addition to representing the number "3," and the number "5" may represent the letters "J," "K," or "L," in addition to representing the number "5." The characters "3" and "5" are also ambiguous in the sense that it may be unclear from the input "35" which particular capability, and/or which networked device, is being referenced.

As shown, the input field 410B includes a cursor. The cursor illustrates that additional ambiguous characters (e.g., after the input "35") may be entered by the user or provided by the mobile unit 110. For example, the user enters the next digit in a telephone number that begins with "35." In another example, the mobile unit 110 recognizes the initial sequence "35" as the beginning of a telephone number, and may complete the number (or a portion thereof) by supplying the next digit in the input field 410B. Additional ambiguous characters may be useful in determining a capability and/or networked device that is related to the input.

The results 420B-440B display capabilities that are responsive to the input "35." To determine results 420-440B, the mobile unit 110 analyzes the input provided by the user in the input field 410B. If the input includes a sequence of ambiguous characters, the mobile unit 110 may analyze the ambiguous input to determine results. Additionally or alternatively, the mobile unit 110 may transmit the ambiguous input to a host or other remote location for analysis and then receive from the host a list of capabilities that are responsive to the ambiguous input. In either case, the mobile unit 110 may identify results (e.g., capabilities) that are likely to be responsive to the input and display the results as results 420B-440B.

To begin determination of results that are responsive to the input, in one implementation, the mobile unit 110 first attempts to relate the input to contact information. The contact information may be stored in a contact list within the mobile unit 110 or may be stored at another location that is accessible to the mobile unit 110. As shown in the result 415B, the mobile unit 110 determines that the user who entered the input "35" may be searching for information related to a telephone number that includes the digits "35." For example, the mobile unit 110 determines that the telephone number "202-351-0000" associated with a "John Doeson" relates to the input.

Additionally or alternatively, as shown in the result 420B, the mobile unit 110 may determine that the input "35" also may represent the letters "FL" and, thus, the user may be searching for information related to a contact whose name includes the letters "FL." To this end, the mobile unit 110 determines that the contact entry for a "Flynn Carlson" matches the request, and thus displays the name "Flynn Carlson" along with the associated telephone number of "202-555-0000."

The mobile unit 110 may next attempt to match the input to software applications, such as, for example, e-mail, word processing, or web searching capabilities. As shown in the result 225B, for example, the mobile unit 110 determines that the input "35" relates to the letters "FL" and concludes that the user wish to conduct a web search for "FL".

The mobile unit 110 may next attempt to match the input with the capabilities of one or more networked devices, such as, for example, a television, a portable music player (e.g., an iPod), a movie player (e.g., a DVR), and/or a stereo system. In one example, the mobile unit 110 determines that the input "35" relates to a television channel and, therefore, concludes that the user wish to tune the television to channel 35. Accordingly, and as shown in the result 430B, the mobile unit 110 displays the capability for tuning the television to channel 35. In another example, the mobile unit 110 determines that the input "35" relates to the letters "FL" and, therefore, concludes that the user wish to listen, on a portable music player, to musical track for "Floyd, Pink, 'The Wall.'" Accordingly, and as shown in the result 435B, the mobile unit 110 displays the capability for playing the "The Wall" on the portable music player. In yet another example, the mobile unit 110 determines that the input "35" relates to an oven temperature setting and, thus, concludes that the user seek to set the oven temperature to 350 degrees. Therefore, and as shown in the result 440B, the mobile unit 110 displays the capability of setting an oven temperature to 350 degrees.

In one implementation, the mobile unit 110 renders the results 415B-440B in response to determining that the results 415B-440B are popular results for the input "35." A result may be deemed "popular" if the capability associated with the result is an often-used capability for one or more users. The statistics on often-used capabilities for a single user, a single household or users in general, may be stored at a remote location (e.g., a capability server) and may be accessed by the mobile unit 110. Alternatively or additionally, the statistics on often-used capabilities may be stored on the mobile unit 110. Alternatively or additionally, each of the networked devices 130-160 may store the statistics on the often-used capabilities associated with that device. Regardless of where the information associated with the popular or favorite capabilities is stored, the mobile unit 110 references the information to identity the capability associated with the input. In doing so, the mobile unit 110 may determine that a particular user primarily conducts web searches and controls audiovisual equipment, and thus, may provide these capabilities at the top of a list of results for the ambiguous input "35."

In another implementation, the mobile unit 110 renders the results 415B-440B in response to a current location of the mobile unit 110. For example, based on the current location, the mobile unit 110 determines the networked devices that are present on the network 120 and references the capabilities associated with those devices. For instance, if the user is in living room, the mobile unit 110 determines that only the networked television device 140 is present on the network 120 and in order to resolve the input, the mobile unit 110 references the capabilities associated with the networked television device 140. In this manner, the mobile unit 110 reduces the number of responsive capabilities associated with the input.

Similar to the results 315B-340B, the results 415B-440B also includes a scroll bar along the right edge of the display that includes the results 415B-440B. The scroll bar may be used to access and provide additional results that may not be included in the results 415B-440B due to size constraints or user preference (e.g., only show five capabilities at once).

FIG. 4C illustrates, within displays 410C-435C, an exemplary sequence of interactions between the mobile unit 110 and the user for remotely controlling a networked device based on a determination of a capability associated with an input, and further determination of a networked device associated with the capability. More particularly, each of the displays 410C-435C shows a step in the ongoing interaction by the user with the mobile unit 110.

In display 410C, the mobile unit 110 receives an input of "RE," which has been provided by the user as a textual entry. The input "RE" may be an ambiguous input because it is not readily apparent what capability, or which networked device, the input is referencing.

The mobile unit 110 may determine that the input "RE" relates to a "record" capability. As such, the display 415C shows that the input "RE" has been replaced with the word "record." In some implementations, the display 415C is configured to allow the user to accept or reject the capability determined to be responsive to the input. If, for example, the user rejects the capability, an additional display (not shown) is provided to the user by the mobile unit 110 for user selection via multimode input of a substitute capability, such as, for example, a "recommend content" capability associated with a television set or personal computer.

In the display 420C, the mobile unit 110 displays a list of content items, such as, for example, television shows and movies that may be recorded using the record capability. For example, the mobile unit 110 lists currently playing television programs (e.g., "American Idol" and "Headline News") and movies (e.g. "Raiders of the Lost Ark" and "Fast and the Furious"). The display 420C may be further configured to allow for selection of one or more of the content items. For example, the user selects a content item by highlighting the content item and selecting an "ok" or "enter" command, selecting a number associated with the content item (e.g., touching 1 on a keypad associated with mobile unit 110 for "American Idol"), and/or providing a multimode input (ambiguous or non-ambiguous) to select the content item (e.g., providing the input "AMER" for "American Idol").

In the display 425C, the mobile unit 110 provides a networked device by which the selected content item may be recorded. The provided networked device may be automatically selected by the mobile unit 110 based on a networked device that is present on the network and was most-recently used for the "record" capability. Alternatively or additionally, a recording networked device may be automatically selected if it was recently used to record a content item that is the same as (e.g., a prior episode of "American Idol") or similar to (e.g., another reality show or another show in the same time slot) the selected content item (e.g., "American Idol"). Alternatively or additionally, a recording networked device may be automatically selected if it is a favorite of a particular user.

In another implementation, the user manually selects the recording networked device based on a multimode input. For example, the input "DVR" results in selection of a networked DVR (e.g., TIVO1) by the mobile unit 110 as the networked device on which the selected content item may be recorded.

In a scenario, where the program and the recording networked device are automatically selected, the display 425C also includes a command interface related to user confirmation or rejection of the selected networked device and/or the entire proposed command (e.g., "record American Idol on TIVO1"). The user may select "confirm" to indicate that the program should be recorded on TIVO1, or the user may select "reject" to indicate that the program should not be recorded at all (or that the program should be recorded on a networked device other than TIVO1).

In the display 430C and 435C, the mobile unit 110 provides additional displays related to a user selection of the command interface in the display 425C. For example, as shown in the display 430C, the mobile unit 110 displays an alternate menu, in response to the user selecting the "reject" icon in the display 425C to solicit further information from the user related to the user's selection of the "reject" icon. The display 430C is configured to allow the user to select an alternate networked device to record the program. The mobile unit 110 may be configured to receive input from the user related to an alternate networked device. For example, the user provides a text entry of "2" (or select an entry from a drop-down menu) to change the destination for recording from "TIVO1" to "TIVO2." The user then may provide an input related to the "confirm" element to complete the interaction. In another example, as shown in the display 435C, the mobile unit 110 confirms the recording (e.g., "American Idol on TIVO1"), in response to the user selecting the "confirm" icon in the display 425C. To this end, the mobile unit 110 may transmit a command (e.g., "record American Idol on TIVO1") to the networked device (e.g., the DVR) via the network 120.

FIG. 5A illustrates an exemplary process 500A that is used by a mobile unit to identify a networked device and its particular capabilities based on an input received from the user of the mobile unit. In keeping with the previous example and for convenience, the particular components described with respect to FIG. 1 are referenced in performing the process 500A. More particularly, the process 500A is performed by the mobile unit 110.

As noted above, the process 500A is generally similar to the process 400A. The difference is in the received input. In contrast to the process 400A in which the received input identifies a particular capability associated with a networked device, in process 500A the received input directly identifies a networked device that the user wishes to remotely control. Similar to the process 400A, process 500A includes receiving an input from the user of the mobile unit 110 (510A) and analyzing the input to determine the networked device associated with the input (515A). After analyzing the input, the mobile unit 110 determines that the input directly identifies a networked device (520A). To this end, the mobile unit 110 determines whether the networked device is accessible over the network (525A) and if so established a connection with the networked device (535A). The actions (525A and 535A) are similar to actions (425A and 435A) and therefore are not described here in more detail.

After identifying the networked device, the mobile unit 110 polls the networked device to request the capabilities associated with the networked device (540A). In response to polling the networked device, the mobile unit 110 receives the capabilities associated with the networked device (545A). For example, assuming that the networked device is the networked television device 140, the mobile unit 110 receives, among others, capabilities associated with increasing or decreasing channels and volumes. The mobile unit 110 displays the received capabilities to the user and allows the user to interact with the capabilities to remotely control the networked device (550A).

FIG. 5B illustrate, within displays 510B-530B, an exemplary sequence of interactions 500B between the mobile unit 110 and the user for remotely controlling a networked device. More particularly, each of the displays 510B-530B shows a step in the ongoing interaction by the user with mobile unit 110.

The sequence of interactions 500B begins with the display 510A in which the mobile unit 110 receives an input of "TV." The input may be provided by the users as a textual entry. The input "TV" may be ambiguous because it may not be instantly apparent to the mobile unit 110 to which of many networked devices the input relates. For instance, the input "TV" may relate to either a television or a set top box. After identifying that the input relates to the networked television device 140, the mobile unit attempts to determine whether the networked television device 140 is present on the network 120. Upon positive indication of presence, the mobile unit 110 requests and receives capabilities associated with the networked television device 140.

In the display 515B, the mobile unit 110 displays multiple capabilities for the networked television device 140. The capabilities include, for example, controls related to turning the television "on," tuning the television to a "channel," increasing or decreasing the television "volume," placing the television audio on "mute," tuning the television to a "last channel" or requesting that a recently viewed scene, television show, and/or movie be "replay[ed]."

The mobile unit 110 may be configured to receive further input related to the displayed capabilities of the networked device (e.g., the television). In the display 520B, the mobile unit 110 receives, from the user, an input related to selecting one of the capabilities shown in the display 515B. As shown, the mobile unit 110 receives the ambiguous input "CH," which the user has provided as a textual entry. The mobile unit 110 identifies capabilities, from among those shown in the display 515B, that are associated with the ambiguous input "CH." For example, the mobile unit 110 identifies that the capability for the television that matches "CH" is the channel control. In a slightly different implementation, the mobile unit 110 receives, from the user and within the display 515B, the ambiguous input sequence 2-4 related to the television capability. Like before, the mobile unit 110 identifies capabilities, from among those shown in the display 515B, that are associated with the ambiguous input 2-4; in this case, the channel control.

As a result, in the display 525B, the mobile unit 110 identifies sub-capabilities (e.g., "up," "down," "Last," "5," "31," "more favorites") for controlling the channel control for the television set or set top box. The display 525B may be configured to allow the user to select one or more of the responsive sub-capabilities by, for example, highlighting a sub-capability and selecting an "ok" or "enter" control, selecting from a drop-down menu, or entering from a keypad a number associated with the sub-capability, or entering an input (e.g., ambiguous or non-ambiguous) related to the sub-capability.

In the display 530B, the user selects one of the sub-capabilities by entering the input "up." Once a sub-capability is determined for the input "up," e.g., tuning the television set to a higher numbered channel, the mobile unit 110 may transmit a command (e.g., increment television channel) associated with the responsive capability to the networked device (e.g., the television) via the network 120.

FIGS. 6 and 7 illustrate alternative processes 600 and 700 used for detecting a presence of a networked device on the network. FIG. 6 illustrates an exemplary process 600 used by the mobile unit 110 to directly transmit a request for a presence signal to the networked devices 130-160 that are accessible via the network 120. FIG. 7 illustrates an exemplary process 700 used by the mobile unit 110 to detect presence signal generated from the networked devices 130-160 without a request for the same.

For ease of reference, process 600 is described below in detail, and the redundant aspects of process 700 are not discussed. In keeping with the previous examples and for convenience, particular components described with respect to FIG. 1 are referenced as performing process 600. More particularly, process 600 involves the mobile unit 110 and the networked television device 140. It should be noted that although the networked television device 140 is illustrated as one of the components performing the process 600, this is merely for illustrative purposes and other networked devices, such as, for example, the networked automobile device 130 and the networked oven device 150 may be used instead or in addition to the networked television device 140 to perform similar functions.

Process 600 includes the mobile unit 110 sending an inquiry to find other networked devices (610). The inquiry may be general or specific. The general inquiry may include a request for presence signal from all the networked devices that are presently available on the network 120. In contrast, the specific inquiry is a request for presence signal from a particular networked device (e.g., the networked television device 140). The mobile unit 110 may send a specific inquiry if the mobile unit 110 knows the address and/or name of the particular networked device.

The networked devices that are available on the network 120 are configured to response to such inquiry and indicate their presence. In one example, as shown, the networked television device 140 receives the inquiry or otherwise a request for presence signal (615) and, in response, submits a presence signal (620). The response may include the name, network address(es), and class of the networked television device 140. The mobile unit 110 receives the response (625) and, in turn, submits a request for identification of capabilities and/or services associated with the networked television device 140 (630). The network television device 140 receives the request (635) and, in reply, submits the list of capabilities and/or services associated with the networked television device 140. The capabilities and/or services includes television channels and volume capabilities, for example.

The mobile unit 110 receives the list of capabilities (645). In one implementation, the mobile unit 110 stores (indefinitely or for a limited amount of time) the received capabilities in a capability cache (650). In another implementation, instead of storing the capabilities, the mobile unit 110, after receiving the capabilities, immediately provides them to the user without long-term or short-term storage. To determine whether or not to store the list of capabilities, the mobile unit 110 may reference the type of capabilities associated with the networked device. If the networked device indicates that it has a static command set, the mobile unit 110 stores, within its capability cache, the list of capabilities. On the other hand, if the networked device indicates that it has dynamic capabilities or otherwise a very large command set, the mobile unit 110 does not store the capabilities and requests the capabilities from the networked device as needed.

In the implementation where mobile unit 110 stores the list of capabilities for the networked devices in a capability cache, the capabilities may be stored for varying amounts of time. In one example, the mobile unit 110 stores the list of capabilities for a networked device as long as the networked device is available on the network 120. In another example, the mobile unit 110 stores the list of capabilities for a networked device for a predetermined or user-selected amount of time (e.g., 1 day or 1 week). The cache expiration duration may also be provided by a networked device to the mobile unit 110. In yet another example, the mobile unit 110 stores the list of capabilities for a networked device for a predetermined or user-selected amount of time after one of the capabilities for the networked device has been controlled by the mobile unit 110 (e.g., 1 hour).

In the implementation where the list of capabilities are stored on the networked device, the mobile unit 110 may request the list of capabilities from the networked device each time the mobile unit 110 determines that an input relates to the networked device or each time the mobile unit 110 detects the presence of the networked device on the network 120. The networked device may return a list of capabilities associated with the networked device, where the list includes all or a subset of all the capabilities. The subset may be a list of the top five most recently used capabilities, a set of "favorite" capabilities for a user, and/or a set of capabilities that seem to be responsive to an input submitted by the user and transmitted to the networked device by the mobile unit 110 via the network 120. In this implementation, the mobile unit 110 may provide the determined capabilities immediately, or within a particular amount of time, from receipt of the capabilities from the networked device, thus removing the need to store the list of capabilities on the mobile unit 110, at least for any significant period of time.

FIG. 7 illustrates an exemplary process 700 used by the mobile unit 110 to detect presence signal generated from the networked devices 130-160 without a request for the same. As noted above, process 700 is similar to the process 600. The difference is in that in process 700, the mobile unit 110 does not initiate the request for presence signal and instead the networked device initiates this action. In particular, as shown, process 700 includes the networked television device 140 transmitting a general presence signal to the network 120 (710). The networked television device 140 may transmit such a signal at a predetermined time, user-selected intervals, and/or upon occurrence of a particular event. Regardless of the timing, the mobile unit 110 receives the general presence signal (715) and makes a note of the networked television device 140 presence on the network 120 (720). Thereafter, through actions (725-745), which are similar to the actions (630-650) of process 600, the mobile unit 110 obtains the list of capabilities associated with the networked television device 140.

Figure 8:
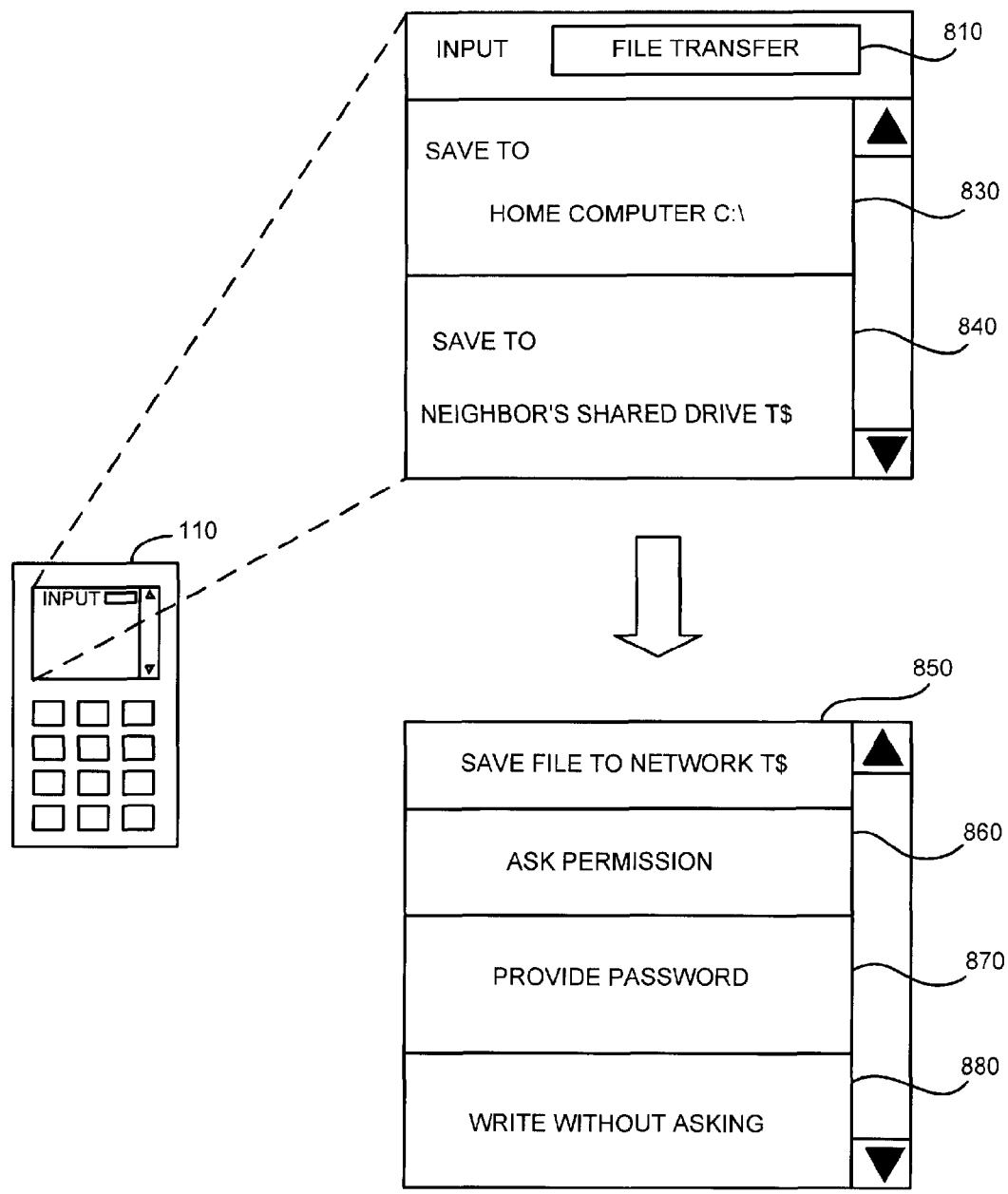
FIG. 8 illustrates another exemplary user interface configured to display results associated with networked devices based on a received input.

Other implementations are contemplated. To this end, FIG. 8 illustrates another exemplary user interface 800 configured to display results associated with networked devices based on the received input. The user interface 800 includes an input field 810 and results 820-880. The input field 810 is configured to allow the user to provide a multimode input. The multimode input may include non-ambiguous or ambiguous input (e.g., T9) and may be provided by the user via a reduced entry keypad, a touch screen, a stylus, a voice command, drop-down menus or a combination thereof.

As shown, input field 810 indicates that the input "file transfer" has been entered by a user. Although the input "file transfer" is clear on its face (e.g., the user wishes to engage a capability related to transferring a file), the input may still be ambiguous in that a networked device related to the "file transfer" capability may not be as readily apparent from the input. Thus, the mobile unit 110 may identify one or more networked devices that include a "file transfer" capability.

The results 820-840 show a list of networked devices that are associated with the input "file transfer." More particularly, the result 820 includes the networked device TIVO1, such that a user may select the result 820 to save a file to, or copy a file from, the device TIVO1. The result 830 includes a home computer device (more particularly, a c:\drive of a home computer), and the result 840 includes a neighbor's shared network drive (more particularly, a drive entitled "T$"), where the user may select one of the results 830 or 840 to save a file to, or copy a file from, the home computer or neighbor's shared network drive.

Upon presentation of the responsive networked devices to the user in the results 820-840, the mobile unit 110 may manually (based on the user's selection) or automatically determine a particular networked device to which the user wishes the input "file transfer" to be related. For example, the user may select results 840, related to the neighbor's shared network drive T$. In addition, the user may select to save a file to the neighbor's shared network drive, rather than copying a file from the neighbor's shared network drive (not shown). In some implementations, the networked device (and whether to save to or copy from) may be automatically selected for a user based on reference to external information (e.g., a user's favorite capabilities list or a list of recently used capabilities). In this implementation, the mobile unit 110 may be configured to allow a user to reject an automatically selected networked device and/or capability and provide another networked device and/or capability in its place.

As shown in the result 850, the mobile unit 110 may display the user-selected networked device and capability (e.g., "save a file to a neighbor's shared network drive T$"). In the results 860-880, the mobile unit 110 displays at least one sub-capability (e.g., "ask permission," "provide password" and "write without asking") for controlling the saving of a file to a neighbor's shared network drive T$. The user may select one or more of the responsive sub-capabilities by, for example, highlighting and selecting an "ok" or "enter" control, selecting a number associated with the sub-capability, or entering another multimode input related to the sub-capability.

In one example, the user selects the sub-capability "write without asking." The mobile unit 110 then transmits a command (e.g., "save file to a neighbor's network drive T$ without asking") to the networked device (e.g., neighbor's shared network drive T$) via the network 120.

In some implementations, after the user enters an input, the input portion of mobile unit 110 may be reset. In one example, the user provides the input "CH," and, in response, the mobile unit 110 analyzes the input to determine a capability (e.g., channel control) related to the input. Upon completing the analysis, the input portion of mobile unit 110 is reset, such that, the next input provided by the user is not being automatically related to the previous input. For example, the user provides a subsequent input of "24." If the input portion is not reset, mobile unit 110 may have analyzed the subsequent input "24" as being related to the "channel control" capability. However, once the input portion has been reset, the mobile unit 110 may analyze the input "24" (as the number "24" or the letters "A, B, C" and "G, H, I") to determine a networked device or a capability (e.g., record the television show "24," tune to channel "24," or set an oven timer to 2 hours, 40 minutes).

Along these lines, in some implementations, inputs representing some or all parts of multiple keywords may be combined as needed to find a specific capability. This allows the user to refine and limit a list of content and capabilities until the desired item appears near the top of the list. For example, the keypad input sequence 8-8-#-2-4, where the # key represents a delimiter between word stems, may match the capability associated with both the device "TV" and "channel." For another example, the input sequence "2-4," where "-" represents a delimiter between the word stems, may match the capability associated with the "car" and "heat".

Some implementations may provide a tabbed display, where a tab may be created for a networked device, or category of device, with current or recent presence. For example, in addition to a general tab displaying results of mobile unit content and networked device capabilities associated with the user input, just the TV capabilities matching the user input may be listed on a separate "TV" tab. Alternately, networked device capabilities may be displayed on one tab while other content types (e.g., MP3 tracks) are displayed on another tab.

In implementations where the mobile unit 110 detects the presence of more than one networked device, capabilities presented to a user as results may be capabilities that are performed by a combination of devices. For example, a user may wish to transfer a recorded episode of the television show "American Idol" to a personal computer, and send the file associated with the recorded episode to a friend via email. To do so, the user may enter an input associated with a "file transfer & email" command. Assuming the mobile unit 110 has detected both a DVR (e.g., TiVo) and personal computer having an email capability, the mobile unit may perform the multi-networked device action.

Also in the implementation where more than one networked device is detected as being present on the network 120, the mobile unit 110 may transmit a command related to a single capability that is received, and responded to, by more than one device. In one example, the user provides the mobile unit 110 with an input related to minimizing an amount of power expenditure by the networked devices in the user's home (e.g., "power min"). To minimize power expenditure, the mobile unit 110, for example, transmits a command to each of the networked devices requesting that each of the networked devices power down when not in use or that the device operate on the lowest power setting. In another example, the mobile unit 110 transmits a command to one networked device (e.g., a microwave oven) to power down, upon receipt of an input that relates to a high-power activity of another networked device (e.g., download a large file to a personal computer). In one implementation, the mobile unit 110 obtains the command and/or script for minimizing power from a secure and/or verified Internet site. Along these lines, the mobile unit 110 may access additional scripts for additional comments associated with the one or more networked devices.

The mobile unit 110 may include, in some implementations, a synonym dictionary. The synonym dictionary may assist the mobile unit 110 in resolving various inputs associated with a single capability or networked device. For example, to indicate that a particular television show should be saved for later viewing, the user may enter any one of inputs "record," "save," or "tape." Thus, upon receiving an input, the mobile unit 110 may access a synonym dictionary (which may be stored at the mobile unit 110 or at some remote location) to determine if the input is related to an input for which a command is known. In the present example, the input "record" may be associated with a "record" command. Thus, if the user enters the input "tape," the mobile unit 110 may refer to the synonym dictionary to determine that "tape" is a synonym for "record," and thus provide the user with a result that is related to the "record" capability. In one implementation, an input may have multiple meanings and as such simplistic synonym substitution may result in unfavorable results. In such situations, keywords may be identified by a globally unique identified, which may be numeric or otherwise, and the user may use the unique identifier for correlating keywords with synonyms.

In some implementations, the mobile unit 110 may suggest advanced commands to a user. For example, setting a DVR to record all episodes of a television show may require that the user take four steps (e.g., require that the mobile unit send four commands to the DVR). If the mobile unit 110 recognizes a command as attempting to perform the 4-step capability, rather than resolving the input to a first capability associated with the first of the four commands (e.g., "record first episode of American Idol"), the mobile unit 110 may analyze the input and resolve the input to the full command (e.g., "record all episodes of American Idol"). Upon selection of the single capability by a user (or automatic selection by the mobile unit 110), the mobile unit 110 then may send each of the four required commands to the networked device to control the capability.

In some implementations, the mobile unit 110 may be configured to require user authentication before a command may be transmitted to a networked device, or before the networked device may act on the command. For example, the mobile unit 110 may determine that the user seeks to tune a television to channel 35. However, at this point, the mobile unit 110 may not have access to information as to whether the user has permission to tune the television to channel 35. For example, the user may be at a restaurant that is currently showing a sporting event on channel 4 when the user attempts to remotely control the television by using the mobile unit 110. Therefore, before transmitting a command ordering the television to tune to channel 35, which would most likely upset other restaurant patrons and management, the mobile unit 110 may solicit an authentication code from the user.

Such a security system may be implemented by, for example, requiring a smart component of a networked device to request an authentication code when a command is received from the mobile unit 110 before obeying the command. For example, the mobile unit 110 sends a command to the television to tune to channel 35. The television receives the command, and in response, requests an authentication code. The mobile unit 110 then solicits entry of an authentication code (that presumably is associated with the television) from the user. Once the user enters the authentication code, the authentication code is transmitted by the mobile unit 110 to the television. The television determines if the code is satisfactory (e.g., whether the code is a match for authorized codes stored within the smart component of the networked device or accessed from another location), and if so, tunes the television to channel 35. If the code is not satisfactory, however, the television may transmit a "permission denied" message to the mobile unit 110. In response, the mobile unit 110 may display an indication that the user does not have permission to control the particular capability (e.g., change the channel) of the networked device or control any capability of the networked device (e.g., the restaurant television).

Security can also be accomplished by "paring" the networked device and the mobile unit. The pair networked device and the mobile unit establish trusted relationship at a configuration time by sharing a key or passkey. The networked and device may communicate securely by encrypting their transmission with the key. As such, only the mobile unit that is the pair of networked device can communicate with the networked device.

Although this document references solicitation, and receipt, of ambiguous inputs, the mobile unit 110 may respond in the same manner as that described when non-ambiguous inputs are received. In one example, the mobile unit 110 receives the input "change bedroom TV channel" and recognizes the capability that is being requested (e.g., tuning a television located in the bedroom to another channel) without requiring any disambiguation.

In some implementations, the mobile unit 110 may learn from user behavior. For example, the mobile unit 110 automatically sorts capabilities by how often the capabilities are selected by the user and how often commands related to the capabilities are sent over the network to a networked device. Thus, some, or all of, the most frequent capabilities selected by the user may automatically be shown at the top of a capability list or may be more likely to be provided as a result to a related ambiguous input. Furthermore, as particular capabilities become more or less popular (e.g., are selected more or less often by a user), the capabilities may be moved up or down in the list of capabilities or possible results for an ambiguous input.

In some implementations, the input interface of the mobile unit 110 may be flexible enough to accommodate all classes of networked devices, even ones that are not yet on the market. As long as a future networked device is configured to receive, and respond to, requests for information and respond to commands related to a capability of the networked device over a network, the future networked device may be remotely controlled by the mobile unit 110. The capabilities and commands sent and received should contain human-readable strings for display. The exchanged capabilities and commands may be formatted using XML or some other standardized open or proprietary markup language to ensure that the information is easily parseable by both future networked devices and future mobile units.

In another implementation and unlike some of the implementations described thus far, the execution capability may not be with the mobile unit 110 or with the device at which the data that is being sought originally resides and the mobile unit may be used to bridge devices. To illustrate, assume that the user is looking for a music file named "Stairway to Heaven." To this end, the user uses the mobile unit 110 to retrieves this file. For example, the user enters within the mobile unit 110 the keyword "Stairway." The mobile unit 110 receives the keyword "Stairway" and forwards this information to a remote music server and requests from the music server results matching the keyword "Stairway." The music server returns to the mobile unit 110 the matching music file "Stairway to Heaven." The mobile unit 110 displays the matching result to the user and upon receiving an indication that this is indeed the file the user is looking for (e.g., selection of the play button), the mobile unit 110 sends this file to a remote music player for execution. As such, the mobile unit 110 acts as a bridge between the music server and the remote music player.

In another implementation, although the devices 110-160 have been described as being networked devices. They can also be descried or referred to as being networkable devices. As such, one of the devices 110-160 may not be currently connected to the network 120 and may create a spontaneous network, for example, through handshaking with another one of the devices 110-160 speaking the same protocol.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications also are contemplated.

What is claimed is:

1. A method for remotely controlling wirelessly networked devices via a mobile unit, the method comprising:
    receiving, at a mobile unit and from a user, an input;
    analyzing the input to identify a networked device associated with the input, determining whether the networked device is presently accessible via a wireless network;
    establishing a connection with the networked device;
    identifying capabilities associated with the networked device;
    displaying, in a list, capabilities previously selected by the user to control the networked device; and
    enabling the user to interact with the networked device through the mobile unit based on selection from among the capabilities in the list;
    wherein the input is ambiguous with respect to which of the networked devices the input pertains, the method further comprising:
    identifying that the input corresponds to different capabilities associated with at least two of the networked devices;
    utilizing the list to identify the at least two networked devices; and
    querying the user to learn which of the at least two networked devices to which the input pertains.

2. The method of claim 1 wherein receiving the input includes receiving, at a wireless phone, the input.

3. The method of claim 1 wherein receiving the input includes receiving an input that identifies the networked device with which the user wishes to interact.

4. The method of claim 3 further comprising:
    determining whether the networked device is presently accessible on the wireless network; and
    if it is determined that the networked device is presently accessible on the wireless network, presenting to the user one or more capabilities associated with the networked device.

5. The method of claim 4 wherein presenting to the user one or more capabilities associated with the networked device includes:
    requesting, from the networked device, the one or more capabilities;
    receiving, from the networked device, the one or more capabilities; and presenting to the user the received one or more capabilities.

6. The method of claim 5 wherein:
- requesting the one or more capabilities includes requesting, from the networked device, a subset of all available capabilities;
- receiving the one or more capabilities includes receiving, from the networked device, the subset of all available capabilities; and
- presenting to the user the received one or more capabilities includes presenting to the user the received subset of all available capabilities.

7. The method of claim 6 wherein requesting the subset of all available capabilities includes requesting the most popular, recently used, or favorite capabilities.

8. The method of claim 7 further comprising referencing a personal profile of the user to determine the most popular, recently used, or favorite capabilities.

9. The method of claim 7 further comprising referencing a demographic location of the user to determine the most popular, recently used, or favorite capabilities.

10. The method of claim 7 further comprising referencing attributes associated with a user group of the user to determine the most popular, recently used, or favorite capabilities.

11. The method of claim 4 wherein enabling the user to interact with the networked device includes:
- enabling the user to interact with the one or more presented capabilities; and
- based on the user's interaction with the one or more presented capabilities, sending a command to the networked device instructing the networked device to control the one or more presented capabilities.

12. The method of claim 4 further comprising informing the user that the networked device does not appear on the wireless network upon determination of the same.

13. The method of claim 4 wherein presenting to the user one or more capabilities associated with the networked device includes:
- requesting, from an external server, the one or more capabilities;
- receiving, from the external server, the one or more capabilities; and
- presenting to the user the received one or more capabilities.

14. The method of claim 13 wherein requesting the one or more capabilities includes requesting, from the external server, the one or more capabilities either before or after determining the accessibility of the networked device.

15. The method of claim 13 wherein:
- requesting the one or more capabilities includes requesting, from the external server, a subset of all available capabilities;
- receiving the one or more capabilities includes receiving, from the external server, the subset of all available capabilities; and
- presenting to the user the received one or more capabilities includes presenting to the user the received subset of all available capabilities.

16. The method of claim 15 wherein requesting the subset of all available capabilities includes requesting the most popular, recently used, or favorite capabilities.

17. The method of claim 16 further comprising referencing a personal profile of the user to determine the most popular, recently used, or favorite capabilities.

18. The method of claim 17 wherein referencing the personal profile of the user to determine the most popular, recently used, or favorite capabilities include:
- referencing the personal profile of the user to identify capabilities that have been used more than a threshold amount; and
- rendering the capabilities that have been used more than the threshold amount as the most popular, recently used, or favorite capabilities.

19. The method of claim 16 further comprising referencing a geographic location of the user to determine the most popular, recently used, or favorite capabilities.

20. The method of claim 19 wherein referencing the geographic location of the user to determine the most popular, recently used, or favorite capabilities include:
- referencing the geographic location of the user to identify capabilities that have been used, by at least one other user within the geographic location, more than a threshold amount; and
- rendering the capabilities that have been used more than the threshold amount as the most popular, recently used, or favorite capabilities.

21. The method of claim 16 further comprising referencing attributes associated with a user group of the user to determine the most popular, recently used, or favorite capabilities.

22. The method of claim 21 wherein referencing the attributes associated with the user group to determine the most popular, recently used, or favorite capabilities include:
- referencing the attributes associated with the user group to identify capabilities that have been used, by members of the user group, more than a threshold amount; and
- rendering the capabilities that have been used more than the threshold amount as the most popular, recently used, or favorite capabilities.

23. The method of claim 1 wherein receiving the input includes receiving an input that relates to a capability of a networked device that the user wishes to control.

24. The method of claim 23 wherein analyzing the input includes:
- analyzing the input to identify the capability associated with the input; and
- based on the identified capability, identifying a networked device associated with the capability.

25. The method of claim 24 wherein analyzing the input to identify the capability associated with the input further includes:
- referencing a database that includes a list of available capabilities associated with one or more networked devices;
- comparing the input with the available capabilities to identify a responsive capability associated with the input; and
- based on the result of comparison, identifying at least one responsive capability.

26. The method of claim 25 wherein referencing the database includes referencing a database stored at the mobile unit.

27. The method of claim 25 further comprising:
- displaying to the user of the mobile unit the identified at least one responsive capability; and
- soliciting the user to select from the identified at least one responsive capability.

28. The method of claim 25 further comprising:
- determining whether the identified at least one responsive capability requires an additional input from the user for controlling the at least one responsive capability;
- if it is determined that no additional input is required, sending a command signal to the networked device associated with the at least one responsive capability and thereby remotely controlling the networked device; and
- if it is determined that an additional input is required, requesting the additional input from the user.

29. The method of claim 1 wherein analyzing the input further includes:
sending the input to a server; and
receiving, from the server, information that identifies the networked device associated with the input.

30. The method of claim 29 wherein sending the input to the server includes sending the input to an external server that is remotely accessible by the mobile unit.

31. The method of claim 29 wherein the server is remotely accessible via a wireless network.

32. The method of claim 29 wherein determining whether the networked device is presently accessible via a wireless network further includes:
sending, to the server, the information that identifies the networked device; and
receiving, from the server, information identifying present accessibility of the networked device.

33. The method of claim 32 wherein the information identifying present accessibility of the networked device includes information identifying that the networked device is presently accessible.

34. The method of claim 32 wherein the information identifying present accessibility of the networked device includes information identifying that the networked device is presently not accessible.

35. The method as in claim 1 further comprising:
receiving an identity of the user; and
identifying the capabilities to include in the list based on capabilities previously selected by the user to control the networked device.

36. The method as in claim 1 further comprising:
presuming that an operator of the mobile unit is a particular user;
via querying the operator, detecting that the operator of the mobile unit is the particular user; and
wherein the list includes capabilities previously selected by the particular user to control the networked device.

37. The method as in claim 1, wherein determining that the networked device is accessible includes:
receiving a communication from the networked device, the communication indicating that the networked device is accessible.

38. The method as in claim 1 further comprising:
receiving the list of previously selected capabilities from the networked device.

39. The method as in claim 1 further comprising:
utilizing demographic information about the user to determine the different capabilities to which the input pertains.

40. The method as in claim 1 further comprising:
sorting an order of capabilities in the list depending on a frequency in which the user previously selected the capabilities.

41. The method as in claim 40 further comprising:
adjusting the order of capabilities in the list depending on a length of time that has elapsed since a previous selection of a respective capability in the list.

42. The method as in claim 1 further comprising:
generating the list based at least in part on a current location of the mobile unit.

43. A mobile unit configured for remotely controlling wirelessly networked devices, the mobile unit comprising:
a processing device; and a memory storing executable instructions for causing the processing device to:
receive, at a mobile unit and from a user, an input;
analyze the input to identify a networked device associated with the input, determine whether the networked device is presently accessible via a wireless network;
establish a connection with the networked device;
identify the capabilities associated with the networked device;
display, in a list, capabilities previously selected by the user to control the networked device; and
enable the user to interact with the networked device through the mobile unit based on selection from among the capabilities in the list;
wherein the input is ambiguous with respect to which of the networked devices the input pertains, the memory storing executable instructions for causing the processing device to:
identify that the input corresponds to different capabilities associated with at least two of the networked devices;
utilize the list to identify the at least two networked devices; and
query the user to learn which of the at least two networked devices to which the input pertains.

44. A method for remotely controlling a networked device via a mobile device, the method comprising:
identifying, at a mobile device and over a wireless network, a subset of networked devices presently accessible via the wireless network;
identifying a current location of the mobile device;
identifying capabilities associated with at least one networked device that is in a vicinity of the current location of the mobile device, the at least one networked device accessible over the wireless network and included in the identified subset;
displaying, on the mobile device, a user interface configured to receive an input associated with the identified capabilities associated with the at least one networked device, wherein the identified capabilities relates to functions performed by the at least one networked device;
receiving, at the mobile device and from a user, an input associated with the identified capabilities;
displaying, in a list, capabilities previously selected by the user to control the at least one networked device;
wherein the input is ambiguous with respect to which of the multiple networked devices the input pertains, the method further comprising:
identifying that the input corresponds to different capabilities associated with at least two networked devices of the multiple networked devices;
utilizing the list to identify the at least two networked devices; and
querying the user to learn which of the at least two networked devices to which the input pertains;
identifying, from among the identified capabilities, a capability responsive to the input; and
sending a command to the at least one networked device for controlling the responsive capability.

45. The method of claim 44 wherein identifying the subset of networked devices includes identifying, at a wireless phone, the subset of networked devices presently accessible via the wireless network.

46. The method of claim 44 wherein identifying the subset of networked devices includes identifying, at a personal digital assistant, the subset of networked devices presently accessible via the wireless network.

47. The method of claim 44 wherein identifying the subset of networked devices includes identifying, at a portable music player, the subset of networked devices presently accessible via the wireless network.

48. The method of claim 44 wherein identifying the capabilities associated with the at least one networked device includes:
   receiving, at the mobile device and from the user, an input being related to controlling the at least one networked device; and
   in response to the received input, identifying the capabilities associated with the at least one networked device.

49. The method of claim 44 wherein identifying the capabilities associated with the at least one networked device includes:
   polling the at least one networked device to identify capabilities identified as being related to one or more functions supported by the at least one networked device; and
   in response to polling the at least one networked device, receiving, at the mobile device, an indication of capabilities identified as being related to the one or more functions supported by the at least one networked device.

50. The method of claim 44 wherein identifying the subset of networked devices includes identifying all networked devices presently accessible via the wireless network.

51. The method of claim 50 wherein identifying the capabilities includes:
   accessing a database that includes capabilities associated with networked devices;
   excluding, from among the capabilities within the database, capabilities associated with networked devices that are not presently accessible on the wireless network; and
   identifying, from among the capabilities within the database, the remaining capabilities.

52. The method of claim 44 wherein displaying the user interface includes displaying a limited menu option that enables the user to select, from among the identified capabilities, a desired capability.

53. The method of claim 44 further comprising:
   determining whether an additional input is needed for controlling the capability responsive to the user input;
   if it is determined that the additional input is needed, requesting, from the user, to provide the additional input; and
   upon receiving the additional input, converting the additional input into a command for controlling the capability responsive to the input.

54. The method of claim 44 further comprising
   determining whether additional input is needed for controlling the capability responsive to the user input; and
   if it is determined that the additional input is not needed, converting the input into a command for controlling the capability responsive to the input.

55. The method of claim 44 wherein identifying capabilities associated with the at least one networked device further includes:
   requesting, from the at least one networked device, the capabilities; receiving, from the at least one networked device, the capabilities; and
   presenting to the user the received capabilities.

56. The method of claim 55 wherein:
   requesting the capabilities includes requesting, from the at least one networked device, a subset of all available capabilities;
   receiving the capabilities includes receiving, from the at least one networked device, the subset of all available capabilities; and
   presenting to the user the received capabilities includes presenting to the user the received subset of all available capabilities.

57. The method of claim 56 wherein requesting the subset of all available capabilities includes requesting the most popular, recently used, or favorite capabilities.

58. The method of claim 57 further comprising referencing a demographic location of the user to determine the most popular, recently used, or favorite capabilities.

59. The method of claim 57 further comprising referencing attributes associated with a user group of the user to determine the most popular, recently used, or favorite capabilities.

60. The method of claim 44 wherein identifying capabilities associated with the at least one networked device further includes:
   requesting, from an external server, the capabilities; receiving, from the external server, the capabilities; and
   presenting to the user the received capabilities.

61. The method of claim 60 wherein requesting the one or more capabilities includes requesting, from the external server, the one or more capabilities either before or after determining the present accessibility of the at least one networked device.

62. The method of claim 60 wherein:
   requesting the capabilities includes requesting, from the external server, a subset of all available capabilities;
   receiving the capabilities includes receiving, from the external server, the subset of all available capabilities; and
   presenting to the user the received capabilities includes presenting to the user the received subset of all available capabilities.

63. The method of claim 62 wherein requesting the subset of all available capabilities includes requesting the most popular, recently used, or favorite capabilities.

64. The method of claim 63 further comprising referencing a personal profile of the user to determine the most popular, recently used, or favorite capabilities.

65. The method of claim 63 further comprising referencing a demographic location of the user to determine the most popular, recently used, or favorite capabilities.

66. A mobile unit configured for remotely controlling wirelessly networked devices, the mobile unit comprising:
   means for receiving, at a mobile unit and from a user, an input;
   means for analyzing the input to identify a networked device associated with the input,
   means for determining whether the networked device is presently accessible via a wireless network;
   means for determining whether to establish a connection with the networked device based on whether the networked device is determined to be presently accessible via the wireless network;
   means for establishing a connection with the networked device if it is determined that the networked device is accessible via the wireless network;
   means for identifying capabilities associated with the networked device;
   means for displaying, in a list, capabilities previously selected by the user to control the networked device; and
   means for enabling the user to interact with the networked device through the mobile unit based on selection from among the capabilities in the list;

wherein the input is ambiguous with respect to which of the networked devices the input pertains the mobile unit further comprising:

means for identifying that the input corresponds to different capabilities associated with at least two of the networked devices;

means for querying the user to learn which of the at least two networked devices to which the input pertains; and means for utilizing the list to identify the at least two networked devices.

67. The method as in claim 44, wherein identifying the at least one networked device is accessible includes:
receiving communications from the at least one networked device, the communications indicating that the networked device is accessible.

68. The method as in claim 44 further comprising:
identifying the capability responsive to the input based on resolving the input as being one of the identified capabilities associated with the at least one networked device, the at least one networked device being in the vicinity of the current location of the mobile device.

* * * * *